(12) United States Patent
Anderton et al.

(10) Patent No.: US 11,962,645 B2
(45) Date of Patent: *Apr. 16, 2024

(54) GUIDED PERSONAL IDENTITY BASED ACTIONS

(71) Applicant: Snap Inc., Santa Monica, CA (US)

(72) Inventors: Landon Anderton, Salt Lake City, UT (US); Garrett Gee, Los Angeles, CA (US); Ryan Hornberger, Playa Vista, CA (US); Kirk Ouimet, Orem, UT (US); Kameron Sheffield, South Jordan, UT (US); Benjamin Turley, Lehi, UT (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,839

(22) Filed: Jun. 2, 2022

(65) Prior Publication Data
US 2022/0303336 A1   Sep. 22, 2022

Related U.S. Application Data

(63) Continuation of application No. 15/991,660, filed on May 29, 2018, now Pat. No. 11,388,226, which is a
(Continued)

(51) Int. Cl.
*G06F 17/00* (2019.01)
*G06F 3/0484* (2022.01)
(Continued)

(52) U.S. Cl.
CPC .......... *H04L 67/104* (2013.01); *G06F 3/0484* (2013.01); *H04L 67/02* (2013.01)

(58) Field of Classification Search
CPC ....... H04L 67/104; H04L 67/02; H04L 63/08; G06F 3/0484; G06Q 10/10; G06Q 30/01;
(Continued)

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
EP 2051480 A1 4/2009
(Continued)

OTHER PUBLICATIONS

Dou, Xue, and Hairong Li. "Creative use of QR codes in consumer communication." International journal of mobile marketing 3.2 (2008): 61-67 (Year: 2008).*
(Continued)

*Primary Examiner* — Andrew T McIntosh
(74) *Attorney, Agent, or Firm* — SCHWEGMAN LUNDBERG & WOESSNER, P.A.

(57) ABSTRACT

Systems and methods for guided personal identity based actions are provided. In example embodiments, a user-specified action from a first user device of a first user is received. The user-specified action pertains to the first user and uses data of the first user when performed. The user-specified action is linked to an identifier. An indication of the identifier is received from a second user device of a second user. In response to receiving the indication of the identifier, the user-specified action linked to the identifier is identified, the data of the first user is accessed, a user interface that includes an option to perform the user-specified action using the data of the first user is generated, and the generated user interface is presented on the second user device.

20 Claims, 14 Drawing Sheets

Related U.S. Application Data continuation of application No. 14/595,712, filed on Jan. 13, 2015, now abandoned.

(51) Int. Cl.
*H04L 67/02* (2022.01)
*H04L 67/104* (2022.01)

(58) Field of Classification Search
CPC ............... G06Q 50/01; H04M 1/2755; H04M 1/72469; H04M 1/27453
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |

(56) References Cited

U.S. PATENT DOCUMENTS

| | | |
|---|---|---|
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,639,621 B1 | 1/2014 | Ellis |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,939,363 B2 | 1/2015 | Powell et al. |
| 8,970,592 B1 | 3/2015 | Petterson |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B2 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Snapchat |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,617 B2 | 1/2017 | Liu et al. |
| 9,628,950 B1 | 4/2017 | Noeth et al. |
| 9,710,821 B2 | 7/2017 | Heath |
| 9,854,219 B2 | 12/2017 | Sehn |
| 10,621,570 B2 | 4/2020 | Meere et al. |
| 11,388,226 B1 | 7/2022 | Anderton et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |

(56) References Cited

U.S. PATENT DOCUMENTS

| | | |
|---|---|---|
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0043858 A1 | 2/2011 | Jetter |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0085829 A1 | 4/2012 | Ziegler |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |

(56) References Cited

U.S. PATENT DOCUMENTS

| | | |
|---|---|---|
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0234907 A1 | 9/2012 | Clark et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0300087 A1 | 11/2012 | Shore et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0018726 A1 | 1/2013 | Ionescu et al. |
| 2013/0024757 A1 | 1/2013 | Doll et al. |
| 2013/0036364 A1 | 2/2013 | Johnson |
| 2013/0041610 A1* | 2/2013 | Waters ............... G06K 7/10792 702/93 |
| 2013/0043302 A1* | 2/2013 | Powlen .................. G06Q 50/01 235/494 |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0191394 A1* | 7/2013 | Bradley ................ G06Q 50/01 707/738 |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | McEvilly et al. |
| 2013/0219479 A1 | 8/2013 | DeSoto et al. |
| 2013/0222323 A1 | 8/2013 | Mckenzie |
| 2013/0227476 A1 | 8/2013 | Frey |
| 2013/0228615 A1 | 9/2013 | Gates et al. |
| 2013/0232194 A1 | 9/2013 | Knapp et al. |
| 2013/0238979 A1 | 9/2013 | Sayers, III et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0282819 A1 | 10/2013 | Mehta |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0314334 A1 | 11/2013 | Leica et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059124 A1 | 2/2014 | Sonog et al. |
| 2014/0082651 A1 | 3/2014 | Sharifi |
| 2014/0092130 A1 | 4/2014 | Anderson et al. |
| 2014/0092813 A1 | 4/2014 | Jaakkola |
| 2014/0096029 A1 | 4/2014 | Schultz |
| 2014/0110468 A1 | 4/2014 | Kandregula |
| 2014/0114565 A1 | 4/2014 | Aziz et al. |
| 2014/0122585 A1 | 5/2014 | DeLong |
| 2014/0122658 A1 | 5/2014 | Haeger et al. |
| 2014/0122787 A1 | 5/2014 | Shalvi et al. |
| 2014/0129428 A1 | 5/2014 | Tyler et al. |
| 2014/0129733 A1* | 5/2014 | Klais ...................... H04L 67/63 709/239 |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0157114 A1 | 6/2014 | Halme et al. |
| 2014/0172531 A1 | 6/2014 | Liberty et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0197234 A1 | 7/2014 | Hammad |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0229251 A1 | 8/2014 | Lim et al. |
| 2014/0230071 A1* | 8/2014 | Adam .................... G16H 20/40 726/26 |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0278978 A1 | 9/2014 | O'connor et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0326793 A1* | 11/2014 | Windmueller ......... G06V 20/20 235/494 |
| 2015/0006672 A1* | 1/2015 | Morel ................ G06Q 30/0269 709/217 |
| 2015/0020086 A1 | 1/2015 | Chen et al. |

(56) References Cited

U.S. PATENT DOCUMENTS

| | | |
|---|---|---|
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0095989 A1 | 4/2015 | An |
| 2015/0096042 A1 | 4/2015 | Mizrachi |
| 2015/0116529 A1 | 4/2015 | Wu et al. |
| 2015/0124791 A1* | 5/2015 | Mazandarany ....... H04W 12/04 370/338 |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0211861 A1 | 7/2015 | Ingerman et al. |
| 2015/0222814 A1 | 8/2015 | Li et al. |
| 2015/0248663 A1* | 9/2015 | Meere ................... G06Q 20/10 705/17 |
| 2015/0254486 A1 | 9/2015 | Shigemitsu |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0350910 A1 | 12/2015 | Eramian |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0156719 A1 | 6/2016 | Mobarak et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | 2016179166 | 11/2016 |

OTHER PUBLICATIONS

Vazquez-Briseno, Mabel, et al. "Using RFID/NFC and QR-code in mobile phones to link the physical and the digital world." Interactive Multimedia 12 (2012): 219-242 (Year: 2012).*

Law, Bobby. "Interactive lectures: encouraging student interaction using Quick Response codes." International Journal on Advances in Intelligent Systems 7.3-4 (2014): 349-360 (Year: 2014).*

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/595,712, Advisory Action dated Apr. 11, 2018", 3 pgs.

"U.S. Appl. No. 14/595,712, Examiner Interview Summary dated Oct. 26, 2015", 3 pgs.

"U.S. Appl. No. 14/595,712, Final Office Action dated May 5, 2017", 14 pgs.

"U.S. Appl. No. 14/595,712, Final Office Action dated May 5, 2017", 13 pgs.

"U.S. Appl. No. 14/595,712, Final Office Action dated Oct. 8, 2015", 18 pgs.

"U.S. Appl. No. 14/595,712, Final Office Action dated Dec. 29, 2017", 29 pgs.

"U.S. Appl. No. 14/595,712, Non Final Office Action dated May 8, 2015", 16 pgs.

"U.S. Appl. No. 14/595,712, Non Final Office Action dated Jun. 9, 2016", 14 pgs.

"U.S. Appl. No. 14/595,712, Non Final Office Action dated Aug. 3, 2017", 28 pgs.

"U.S. Appl. No. 14/595,712, Response filed Jan. 7, 2016 to Final Office Action dated Oct. 8, 2015", 16 pgs.

"U.S. Appl. No. 14/595,712, Response filed Feb. 28, 2018 to Final Office Action dated Dec. 29, 2017", 20 pgs.

"U.S. Appl. No. 14/595,712, Response filed Jun. 16, 2015 to Non Final Office Action dated May 8, 2015", 14 pgs.

"U.S. Appl. No. 14/595,712, Response filed Sep. 7, 2016 to Non Final Office Action dated Jun. 9, 2016", 12 pgs.

"U.S. Appl. No. 15/991,660, Advisory Action dated Jan. 26, 2022", 3 pgs.

"U.S. Appl. No. 15/991,660, Advisory Action dated May 13, 2021", 2 pgs.

"U.S. Appl. No. 15/991,660, Corrected Notice of Allowability dated Apr. 1, 2022".

"U.S. Appl. No. 15/991,660, Final Office Action dated Mar. 31, 2021", 15 pgs.

"U.S. Appl. No. 15/991,660, Final Office Action dated Nov. 10, 2021", 19 pgs.

"U.S. Appl. No. 15/991,660, Non Final Office Action dated Jan. 8, 2020", 12 pgs.

"U.S. Appl. No. 15/991,660, Non Final Office Action dated Jul. 20, 2021", 18 pgs.

"U.S. Appl. No. 15/991,660, Notice of Allowance dated Mar. 7, 2022", 12 pgs.

"U.S. Appl. No. 15/991,660, Response filed Jan. 5, 2022 to Final Office Action dated Nov. 10, 2021", 12 pgs.

"U.S. Appl. No. 15/991,660, Response filed Apr. 2, 2020 to Non Final Office Action dated Jan. 8, 2020", 11 pgs.

"U.S. Appl. No. 15/991,660, Response filed May 5, 2021 to Final Office Action dated Mar. 31, 2021", 12 pgs.

"U.S. Appl. No. 15/991,660, Response filed Aug. 5, 2020 to Restriction Requirement dated Jul. 6, 2020", 2 pgs.

"U.S. Appl. No. 15/991,660, Response filed Oct. 20, 2021 to Non Final Office Action dated Jul. 20, 2021", 13 pgs.

"U.S. Appl. No. 15/991,660, Restriction Requirement dated Jul. 6, 2020", 7 pgs.

(56) References Cited

OTHER PUBLICATIONS

"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013). 13 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report dated Sep. 29, 2015", 2 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXI9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Aniruddh, "Facebook Integrates QR codes for Profiles in Apps", hackerSPACE (Online), URL: https://hackerspace.kinja.com/facebook-intigreats-qr-codes-for-profiles-in-apps-1564650292, (accessed Aug. 2, 2018), 2 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>. (Jan. 23, 2013), 9 pgs.
Kane, Russell, "How to Combine QR Codes with the Power of Facebook", Social Media Examiner (Online), URL: https://www.socialmediaexaminer.com/how-to-combine-qr-codes-with-the-power-of-facebook/, (accessed Aug. 2, 2018), 7 pgs.
Korhan, Jeff, "QR Codes LIKE Your Facebook Page", URL: http://www.jeffkorhan.com/2010/10/qr-codes-like-your-facebook-page.html, (accessed Aug. 2, 2018), 3 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: < URL: http://theinspirationroom.com/daily/2011/starbucks-cup-magic>, (Nov. 12, 2011), 8 pgs.
Mcpherson, Frank, "Scan to Add a Facebook Friend on Android Phones", Adweek (Online), URL: https://www.adweek.com/digital/scan-to-add-a-facebook-friend-on-android-phones/, (accessed Aug. 2, 2018), 1 pg.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Summerson, Cameron, "InstaWiFi Lets You Easily Share Your Wi-Fi Password Through NFC or QR Codes", Android Police (Online), URL: https://www.androidpolice.com/2012/07/24/new-app-instawifi-lets-you-easily-share-your-wi-fi-password-through-nfc-or-qr-codes/, (accessed Aug. 2, 2018), 2 pgs.
Trapani, Gina, "How to Make Your Personal QR Code", URL: https://lifehacker.com/5488323/how-to-make-your-personal-qr-code, (accessed Aug. 2, 2018), 2 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Yarden, "Animate your Advertising with Animation QR Codes", Visualead Blog, [Online] Retrieved from the Internet: <URL: http://blog.visualead.com/animate-advertising-animation-qr-codes/>, (Dec. 10, 2014), 3 pgs.

* cited by examiner

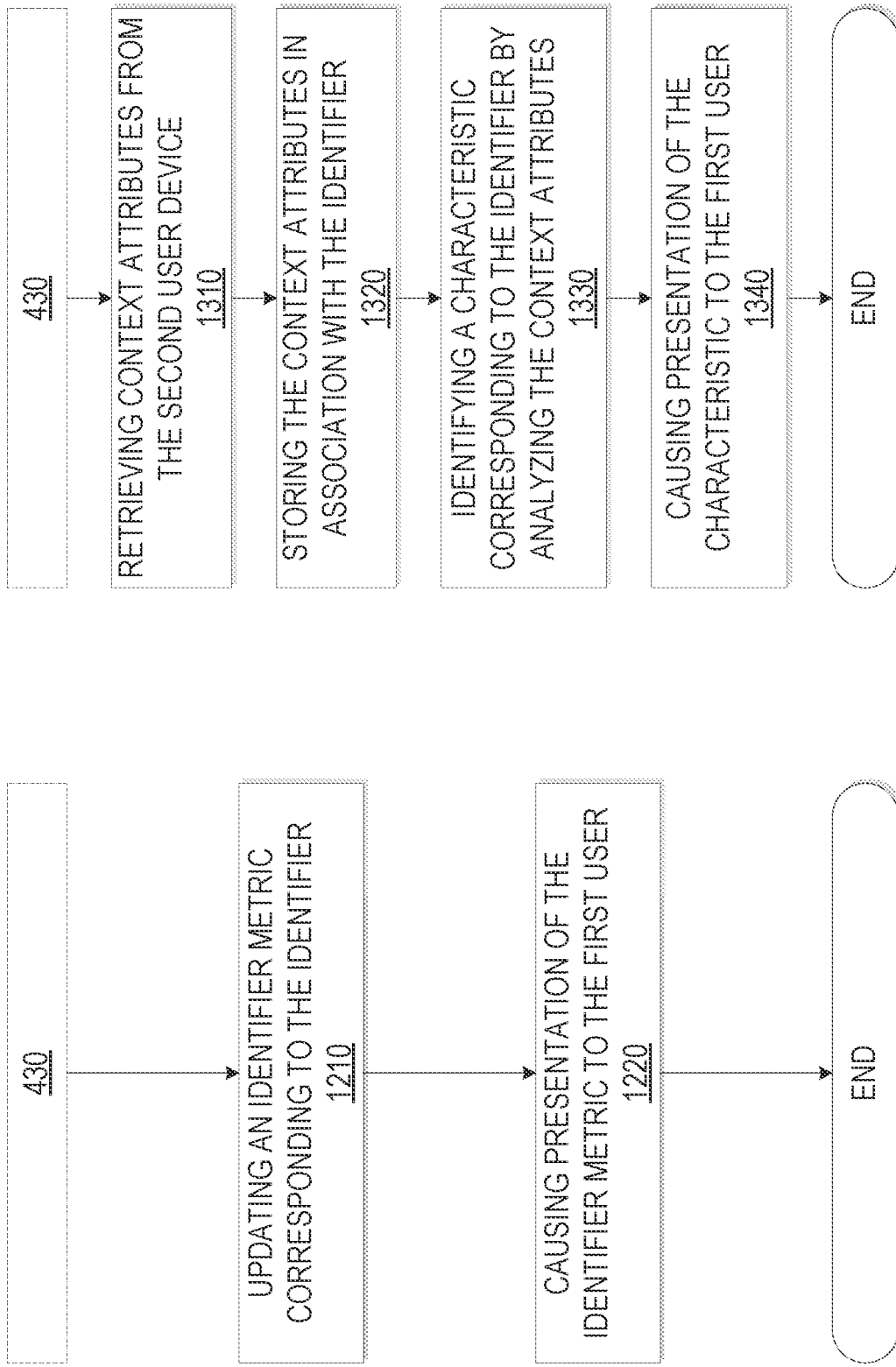

GUIDED PERSONAL IDENTITY BASED ACTIONS

CROSS REFERENCE TO RELATED APPLICATIONS

This application is a continuation of U.S. patent application Ser. No. 15/991,660, filed May 29, 2018, 2015, and entitled "GUIDED PERSONAL IDENTITY BASED ACTIONS," which is a continuation of U.S. patent application Ser. No. 14/595,712, filed Jan. 13, 2015, and entitled "GUIDED PERSONAL IDENTITY BASED ACTIONS." The contents of these prior applications are considered part of this application and are hereby incorporated by reference in their entirety.

TECHNICAL FIELD

Embodiments of the present disclosure relate generally to mobile computing technology and, more particularly, but not by way of limitation, to guided personal identity based actions.

BACKGROUND

Automated identification techniques, such as Quick Response (QR) codes, are a popular way to share and provide small pieces of information to users of mobile devices, wearable devices, and other smart devices. Many automated identification techniques are limited to one-way communication and store a limited amount of data that is often static and non-executable. These characteristics can curb the usefulness of automated identification for tasks involving two-way communication, frequently updated data, or data transfers that exceed a capacity of an automated identification scheme.

BRIEF DESCRIPTION OF THE DRAWINGS

Various ones of the appended drawings merely illustrate example embodiments of the present disclosure and should not be considered as limiting its scope.

FIGS. 12 and 13 are flow diagrams illustrating further example operations for performing analytics associated with guided personal identity based actions, according to some example embodiments.

Figure 1:
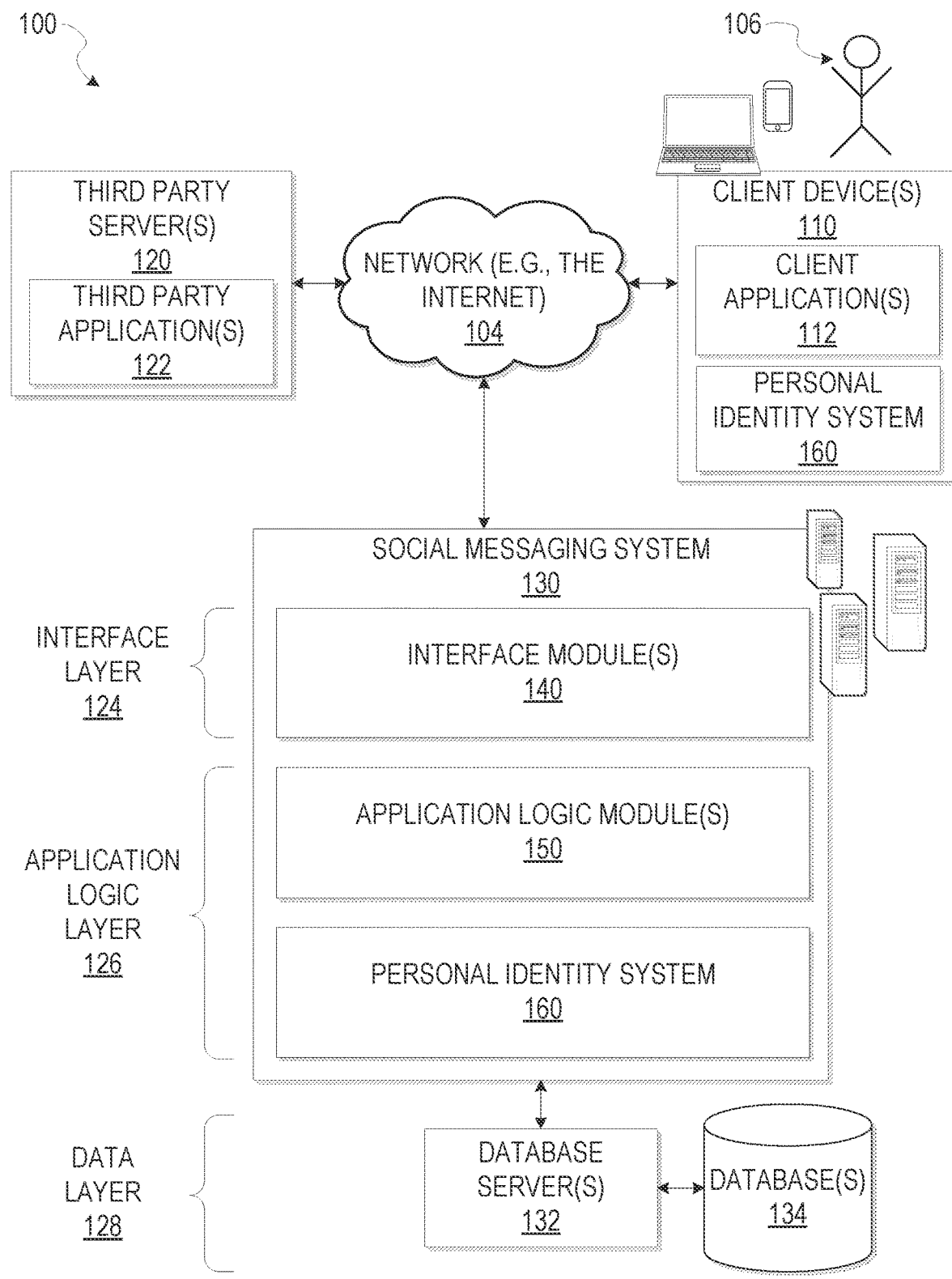
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Automated identification techniques offer a convenient way for users of smart devices to access small pieces of information. For example, QR codes are two-dimensional optical bar codes that encode information readable by a device (e.g., a smart phone) equipped with a camera sensor. In a common scenario, a website address is encoded into a QR code and a smart device scans the QR code to access the website address. In this scenario, a user is directed to a website without guidance or direction as to performing a particular action or task associated with the website or a particular entity associated with the QR code. This aimlessness can diminish the likelihood of the user achieving a purpose of the QR code. According to various example embodiments, a guided, focused objective for a QR code, or similar automated identification scheme, can improve both user experience and the chances of the user completing an action associated with the QR code.

To assist users in providing guided personal identity based actions to other users, in various example embodiments, an application server provides a user interface for a first user to configure an action, task, or other instruction that uses data associated with the first user or entity (e.g., a business, organization, or individual). The application server receives a user-specified action and links the user-specified action to an identifier that can be encoded into a QR code or another type of automated identification tag (e.g., Radio Frequency Identification (RFID) tags, Near Field Communication (NFC) tags, smart tags, or audio based tags). The application server stores the configuration of the action to be accessed in association with the identifier.

Subsequently, a second user scans the QR code to trigger communication of an indication of the identifier encoded in the QR code to the application server that is storing or can facilitate retrieval of the configuration of the user-specified action. The application server identifies the user-specified action linked to the identifier and accesses the data of the first user to be used when performing the user-specified action. The application server uses the data of the first user to facilitate performing the user-specified action (e.g., the data of first user can include a member identification on a social network service used to facilitate a particular social network action such as friending the first user). In some embodiments, the first user can provide the data during configuration or a specification of the data to be retrieved dynamically by the application server. For instance, the application server can dynamically retrieve or access the data when the user-specified action is performed. This may be desirable in situations where the data is subject to change (e.g., a current geolocation of a food truck that is frequently in different locations). In some instances, the application server can automatically perform, on behalf of the second user, the user-specified action using the data of the first user. In other instances, the application server generates a user interface including an option to perform the user-specified action using the data of the first user and the user interface is presented to the second user.

The user-specified action can comprise a wide variety of actions that pertain to the first user or another entity. For example, the user-specified action can include providing certain data (e.g., directions to a particular geolocation specified by the first user or network login information), sending a text message to a certain number with a certain message content, placing a phone call to a certain number, adding an event to a calendar of the second user and the first user, downloading a particular media file (e.g., a song or an app), providing payment information to facilitate a payment to the first user, establishing a peer-to-peer communication link between a device of the first user and a device of the second user in real time (e.g., BLUETOOTH® pairing of devices), automatically logging into an online account, automatically becoming a member of an online service, a social network action (e.g., like, favorite, connect, friend, follow, post, tag, or check-in), or any suitable combination thereof.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., guided personal identity based actions) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receive requests from various client-computing devices and servers, such as client device(s) 110 executing client application(s) 112, and third party server(s) 120 executing third party application(s) 122. In response to received requests, the interface module(s) 140 communicate appropriate responses to requesting devices via a network 104. For example, the interface module(s) 140 can receive requests such as Hypertext Transfer Protocol (HTTP) requests, or other web-based Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User(s) 106 can be a person, a machine, or other means of interacting with the client device(s) 110. In some embodiments, the user(s) 106 interact with the social messaging system 130 via the client device(s) 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

As illustrated in FIG. 1, the social messaging system 130 includes a personal identity system 160. In various embodiments, the personal identity system 160 can be implemented as a standalone system and is not necessarily included in the social messaging system 130. In some embodiments, the client device(s) 110 include a portion of the personal identity system 160 (e.g., a portion of the personal identity system 160 included independently or in the client application(s) 112). In embodiments where the client device(s) 110 includes a portion of the personal identity system 160, the client device(s) 110 can work alone or in conjunction with the portion of the personal identity system 160 included in a particular application server or included in the social messaging system 130.

Figure 2:
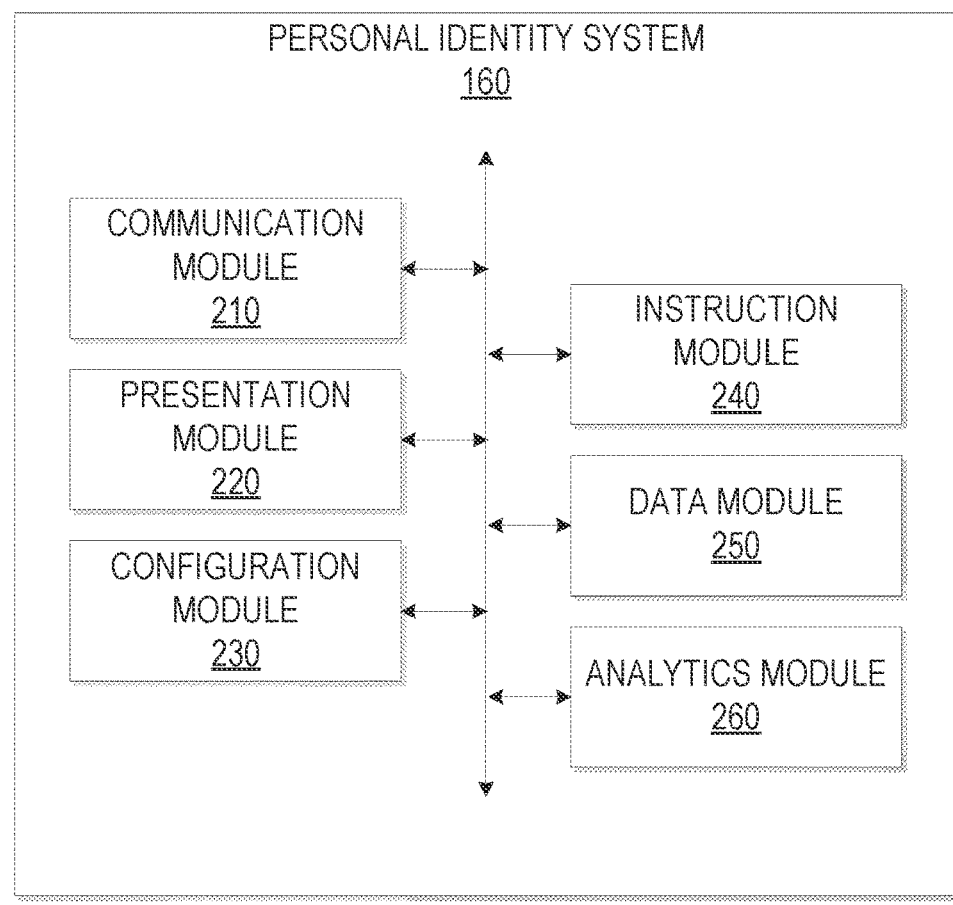
FIG. 2 is a block diagram illustrating an example embodiment of a personal identity system, according to some example embodiments.

FIG. 2 is a block diagram 200 of the personal identity system 160. The personal identity system 160 is shown to include a communication module 210, a presentation module 220, a configuration module 230, an instruction module 240, a data module 250, and an analytics module 260. All, or some, of the modules 210-260 communicate with each other, for example, via a network coupling, shared memory, and the like. Each module of the modules can be implemented as a single module, combined into other modules, or further subdivided into multiple modules. Other modules not pertinent to example embodiments can also be included, but are not shown.

The communication module 210 provides various communications functionality. For example, the communication module 210 receives an indication of an identifier linked to a particular user-specified action. In a specific example, when the client device(s) 110 scan a QR code, the client device(s) 110 communicate an indication of the identifier extracted from the QR code to the communication module 210. The communication module 210 exchanges network communications with the database server(s) 132, the client device(s) 110, and the third party server(s) 120. The information retrieved by the communication module 210 includes data associated with the user (e.g., member profile data from an online account or social network service data) or other data to facilitate the functionality described herein.

The presentation module 220 provides various presentation and user interface functionality operable to interactively present and receive information to and from the user. For instance, the presentation module 220 is utilizable to present machine-readable visual representations of an identifier (e.g., a QR code), a user interface configured to receive guided personal identity based action configuration data, or a user interface configured to provide an option to perform a guided personal identity based action. In various embodiments, the presentation module 220 presents or causes presentation of information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 220 provides many other user interfaces to facilitate functionality described herein. The term "presenting" as used herein is intended to include communicating information or instructions to a particular device that is operable to perform presentation based on the communicated information or instructions.

The configuration module 230 provides functionality that allows users to upload configuration data for guided personal identity based actions such as user-specified actions and data for the user-specified actions. For example, the configuration module 230 can cause presentation of a user interface that includes multiple action options on the client device(s) 110. In this example, a user specifies a particular action by selecting one of the multiple action options included in the user interface. The user can also specify data associated with the user-specified action. In this way, the configuration module 230 facilitates configuration and upload of user-specified actions and data for the user-specified actions.

The instruction module 240 provides functionality associated with performing the user-specified action. For example, the instruction module 240 identifies the user-specified action linked to a particular identifier (e.g., via a lookup of the user-specified action using the identifier). The instruction module 240 can perform or cause another device to perform the user-specified action. In further embodiments, the instruction module 240 modifies, alters, or otherwise augments the user-specified action based on a variety of data. For instance, the instruction module 240 determines a device capability to perform certain actions based on user data (e.g., determining that the user is a member of a particular social network service prior to performing an action associated with the particular social network service). In still further embodiments, the instruction module 240 can infer a preference of the user based on the user data (e.g., identifying a most frequently or recently used social network service indicates a preference for actions associated with the most frequently or recently used social network service). In various embodiments, the instruction module 240 can exchange network communications with the third party server(s) 120, the client device(s) 110, or various components of the social messaging system 130 to facilitate performing or causing performance of the user-specified action.

The data module 250 provides various data functionality such as exchanging information with databases or servers. For example, the data module 250 accesses data from the third party server(s) 120, the database(s) 134, and the client device(s) 110. In a specific example, the data module 250 accesses data used by the instruction module 240 to perform or cause performance of the user-specified action. In some instances, the data module 250 accesses the data for the user-specified action that is stored with the user-specified action (e.g., stored in the database(s) 134). In other instances, the data module 250 retrieves the data for the user-specified action from the client device(s) 110, the third party server(s) 120, or other storage devices.

The analytics module 260 provides functionality to generate various analytics data associated with a particular identifier linked to the user-specified action. For example, the analytics module 260 can identify a characteristic corresponding to a particular identifier by analyzing context attributes associated with the identifier. For instance, the context attributes include attributes associated with a context corresponding to receiving an indication of a particular identifier (e.g., a geolocation of where a particular identifier was detected, a device type that detected the particular identifier). In some embodiments, the analytics module 260 updates, maintains, or otherwise manages data associated with the context associated with receiving indications. For instance, the analytics module 260 increments an access count each time an indication is received at the communication module 210.

Figure 3:
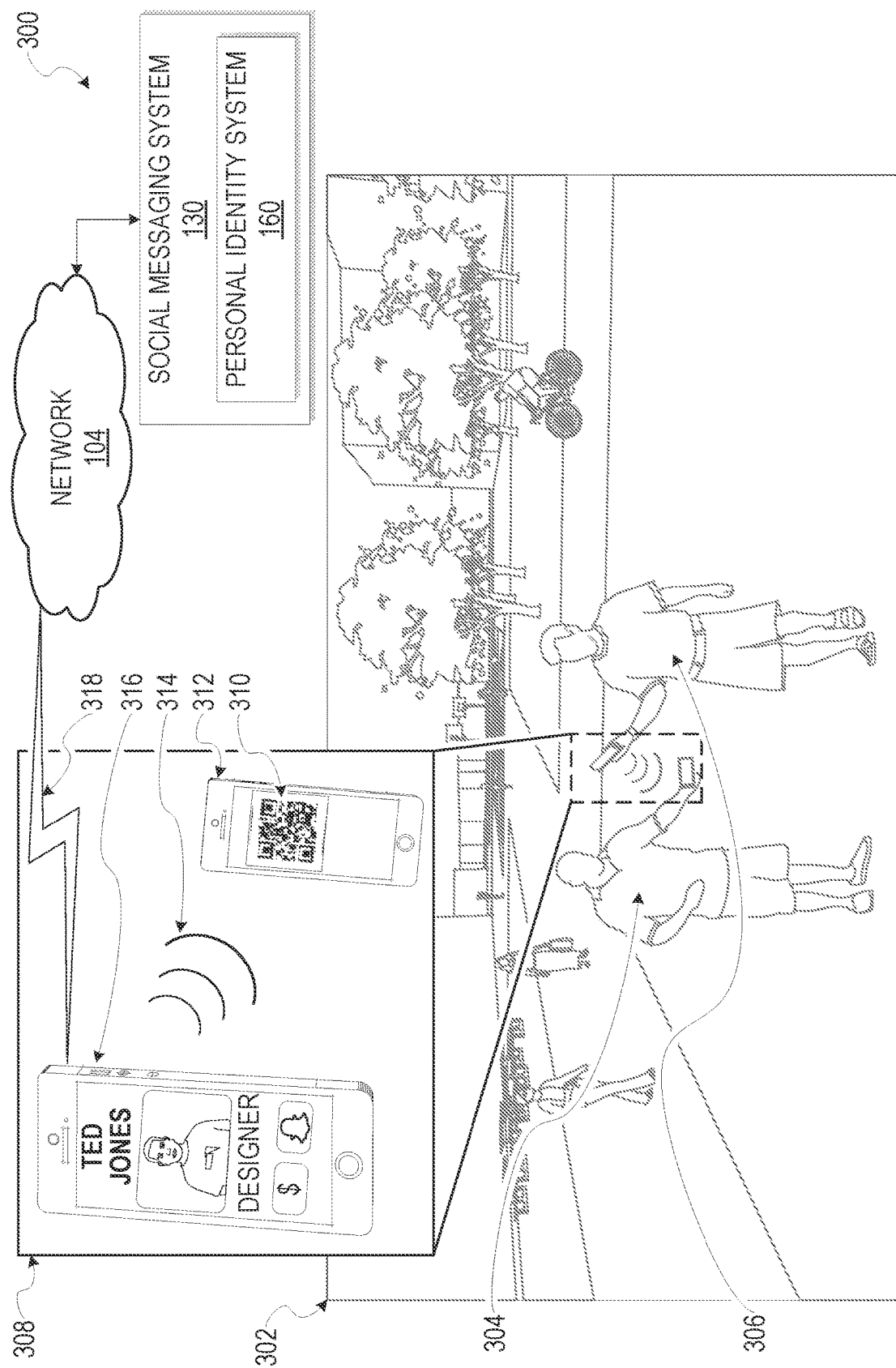
FIG. 3 is a diagram illustrating an example of guided personal identity based actions, according to some example embodiments.

Turning now to FIG. 3, a diagram 300 illustrating an example of guided personal identity based actions is shown. FIG. 3 is an overview of a particular example implementation of the personal identity system 160 facilitating a guided personal identity based action. Additional details and alternative implementations are discussed in connection with the figures to follow. In the diagram 300, a scene 302 illustrates a first user 304 and a second user 306. A scene 308 portrays an enlarged view of a portion of the scene 302. The scene 308 shows a first user device 312 of the first user 304 and a second user device 316 of the second user 306. The first user device 312 is displaying a code 310 (e.g., a machine-readable visual representation such as a QR code) that encodes an identifier detectable by the second user device 316. The second user device 316 employs a camera sensor, or another optical sensor, to detect or scan a signal 314 (e.g., a camera sensor capturing an optical signal) corresponding to the code 310. After scanning the code 310, the second user device 316 decodes the identifier encoded in the code 310. The second user device 316 is communicatively coupled to the network 104 and the social messaging system 130 via a communication link 318, allowing for an exchange of data between the personal identity system 160 and the second user device 316.

In an example scenario, the first user 304 has previously provided configuration data to the personal identity system 160 for a guided personal identity based action. For instance, the first user 304 provided a specification of an action that performs a social network action such as forming a relationship with another member on a social network service. In this instance, the user-specified action uses a member identification of the first user 304 on the social network service to perform the social network action. Subsequent to the first user 304 providing the user-specified action, the personal identity system 160 links the user-specified action to an identifier (e.g., an identifier corresponding to the first user 304 or a unique identifier to distinguish the user-specified action from among other user-specified actions). The personal identity system 160 can also generate the code 310 that encodes the identifier. The first user device 312 stores the code 310 that encodes the identifier corresponding to the user-specified action provided by the first user. After configuration of the guided personal identity based action is complete, the first user 304 can display and share the code 310 with other users such as the second user 306. For example, the code 310 can be physically printed and distributed (e.g., on a billboard, in a newspaper publication, or on a business card), displayed on a display screen of the first user device 312, or displayed on another device.

Continuing with the example scenario, the first user 304 displays the code 310 on a display screen of the first user device 312 and the second user 306 operates a camera sensor of the second user device 316 to physically detect the code 310. Once the second user device 316 detects and decodes the identifier from the code 310, the second user device 316 provides an indication of the identifier to the personal identity system 160. In response to receiving the indication of the identifier, the personal identity system 160 identifies the user-specified action previously linked to the identifier during configuration of the guided personal identity based action, generates a user interface that includes an option to perform the user-specified action using the data of the first user 304, and causes presentation of the generated user interface on the second user device 316. As shown in the diagram 300, the second user device 316 is displaying a user interface that includes a user interface element that, when activated by an operator of the second user device 316, performs (or causes to be performed) the user-specified action. In this scenario, the personal identity system 160 performs the user-specified action by identifying the first user 304 and the second user 306 on a particular social network service and forming a relationship between the first user 304 and the second user 306 on the social network service. In some embodiments, no action aside from receiving the identifier is required before performing the user-specified action (i.e., an action commences immediately upon scanning). In some of these instances, a user interface may be displayed merely to inform a user that the user-specified action has occurred. Thus, FIG. 3 illustrates an example implementation of the personal identity system 160 facilitating a guided personal identity based action configured by the first user 304 and provided to the second user 306.

Figure 4:
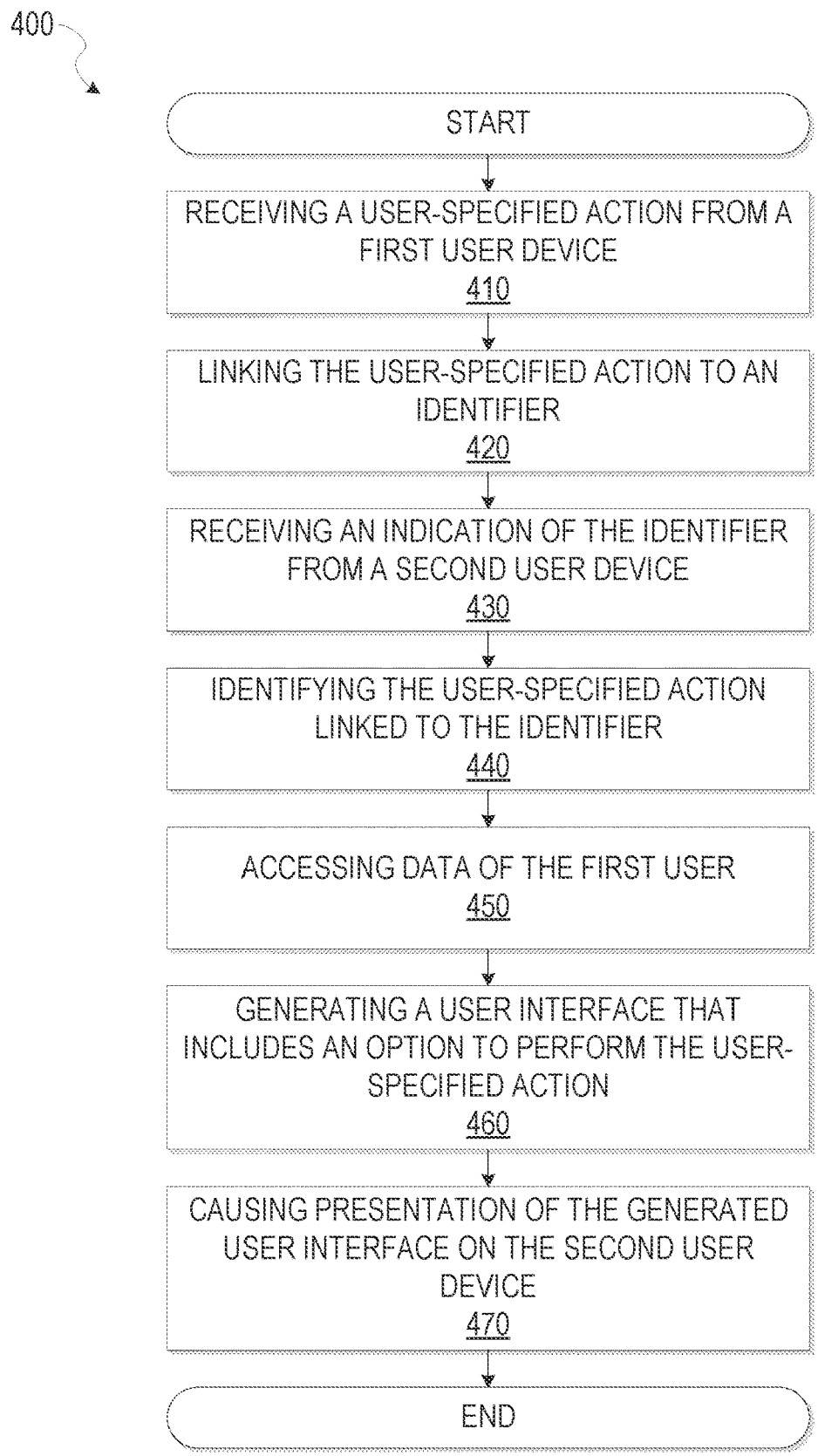
FIG. 4 is a flow diagram illustrating an example method for guided personal identity based actions, according to some example embodiments.

FIG. 4 is a flow diagram illustrating an example method 400 for guided personal identity based actions. The operations of the method 400 may be performed by components of the personal identity system 160, and are so described below for the purposes of illustration.

At operation 410, the configuration module 230 receives a user-specified action from a first user device of a first user. The user-specified action pertains to the first user and uses data of the first user when performed. In some embodiments, the user-specified action comprises multiple user-specified actions received from the first user device, each of the multiple user-specified actions pertaining to the first user and using data of the first user when performed.

The instruction module 240 uses the data of the first user to facilitate performing the user-specified action. For instance, the data of the first user comprises a member identification operable to identity the first user on a social network service. In this instance, the user-specified action can comprise a social network action of the social network service such as liking, friending, favoriting, posting, and so forth. The personal identity system 160 can perform (or cause performance of) the social network action by the instruction module 240 identifying the first user (using the data of the first user) and a second user on the social network service and sending a request to the social network service to perform the social network action involving the first user and the second user.

In various embodiments, the first user specifies rules or conditions associated with the user-specified action. In these embodiments, the instruction module 240 determines satisfaction of the condition prior to performing the user-specified action (e.g., if the condition is satisfied perform the user-specified action, and if the condition is not satisfied do not perform the user-specified action). In a specific example, if the user-specified action is a post or message, the first user can provide a rule for generating the message content to the configuration module 230 (e.g., automatically include a current geolocation of the second user in the message content). In other examples, the user-specified action is not available during a particular time period, or a particular user-specified action is not available to the second user unless the second user has a social network relationship with the first user such as being contacts or connected on the social network service.

In further embodiments, the user-specified action comprises sending a text message, such as a Short Message Service (SMS) message, a Multimedia Messaging Service (MMS) message, an Enhanced Messaging Service (EMS) message, and so forth. In some embodiments, the first user provides a message content for the text message to the personal identity system 160 along with the user-specified action (sending a text message in this example). In other embodiments, the message content is provided by the second user when the user-specified action is performed on the second user device of the second user.

In still further embodiments, the user-specified action comprises providing or sharing information such as contact information, WI-FI® settings, payment information (e.g., to allow for the second user to send a payment to the first user), availability based on the first user's calendar entries, and so forth. In a specific example, the user-specified action comprises providing WI-FI® settings to the second user to allow the second user to establish a connection with a WI-FI® network. In some instances, the first user provides the WI-FI® settings (e.g., a password, network name, and so on) to the configuration module 230 when configuring the user-specified action. In other instances, the instruction module 240, upon performing the user-specific action (in this example providing WI-FI® settings to another user), retrieves the WI-FI® settings and communicates the retrieved WI-FI® settings to the second user device (e.g., retrieved from the first user device in real time and communicated to the second user device). In this way, the first user does not have to manually provide the WI-FI® settings when configuring the user-specified action.

At operation 420, the configuration module 230 links the user-specified action to an identifier. For example, the configuration module 230 stores the user-specified action in association with the identifier such that provided the identifier, the instruction module 240, or another module, can identify the user-specified action using the identifier (e.g., via a lookup in a database). In further example embodiments, the configuration module 230 can generate a machine-readable visual representation (e.g., a QR code) that encodes the identifier (discussed further below in connection with FIG. 8). In other embodiments, the configuration module 230 can encode the identifier using other automated identification schemes (e.g., RFID tags, NFC tags, smart tags, or audio based tags).

At operation 430, the communication module 210 receives an indication of the identifier from the second user device of the second user. In some embodiments, the operation 410 and the operation 420 are performed at a first time and the operation 430 and subsequent operations are performed at a second time occurring after the first time. That is to say, the first user can configure the user-specified action in advance of the second user device providing an indication of the identifier corresponding to the user-specified action.

In various embodiments, the second user device includes components operable to detect a variety of identifiers. In various embodiments, the second user device includes RFID tag reader components, NFC smart tag detection components, optical reader components (e.g., an optical sensor to detect one-dimensional bar codes such as Universal Product Code (UPC) bar codes, multi-dimensional bar codes such as a QR code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or a suitable combination thereof. In a specific example, the second user uses the second user device to scan a QR code being displayed on the first user device. Once the second user device extracts the identifier from the QR code, the second user device transmits an indication of the identifier, such as a network message including the identifier, to the communication module 210.

In response, after the communication module 210 receives the indication of the identifier, at operation 440, the instruction module 240 identifies the user-specified action linked to the identifier. For instance, the instruction module 240 performs a lookup of the user-specified action using the identifier.

At operation 450, the data module 250 accesses the data of the first user to be used when the user-specified action is performed. As discussed above, in some instances, the first user provides data associated with the user-specified action when configuring the user-specified action and the data module 250 simply accesses the data along with the user-specified action. In other instances, the first user provides instructions for retrieving data associated with the user-specified action when configuring the user-specified action. In these instances, the data module 250 retrieves the data associated with the user-specified action according to the instructions provided by the first user. For example, the instructions can comprise a particular type of data to access such as a current geolocation of the user. In this example, the data module 250 queries the first user device, or another specified storage location, to retrieve the data to be used when performing the user-specified action.

At operation 460, the presentation module 220 or the instruction module 240 generates a user interface that includes an option to perform the user-specified action using the data of the first user. In alternative embodiments, the instruction module 240 automatically performs the user-specified action on behalf of the second user in response to receiving the indication of the identifier. In various embodiments, the instruction module 240 augments, adapts, or otherwise modifies the option to perform the user-specified action according to various analyses and according to user-specified rules or conditions provided by the first user during the configuration of the user-specified action.

In an embodiment, the data module 250 accesses user data of the second user stored on the second user device or another storage location (e.g., a third party server such as a server hosting a social network service). For instance, the user data can comprise device type, device model, data download or upload speeds, demographic information of the second user (e.g., age, gender, marital status, or socio-economic status), social networks the second user is a member of, frequently used apps, browser history, and so forth. In these embodiments, the instruction module 240 augments the options (e.g., makes certain options unavailable to the second user) or the user interface including the options (e.g., emphasize a particular option over other options) based on an analysis of the user data of the second user. For instance, the instruction module 240 modifies the user interface or the option to perform the user-specified action according to the user-specified rules or conditions corresponding to the user-specified action. In a specific example, the instruction module 240 can provide access or restrict access to certain user-specified actions based on a social network relationship between the first user and the second user on a particular social networking site (e.g., certain actions are accessible to friends of the first user and unavailable to other users).

In a specific example, the instruction module 240 determines a device capability to perform certain actions based on the user data of the second user. The instruction module 240 identifies a particular user-specified action from among the multiple user-specified actions according to the device capability. The instruction module 240 or the presentation module 220 generates the user interface to include an option to perform the particular user-specified action. As a concrete example, if the user data indicates that the second user is a member of a particular social network service, the instruction module 240 identifies a particular user-specified action associated with the particular social network service and an option to perform the particular user-specified action is included in the user interface. In this way, the instruction module 240 dynamically adapts the user interface according to the device capability of the second user device.

In another example, the instruction module 240 infers a user preference based on an analysis of the user data of the second user, the user preference being indicative of a preference to perform certain actions. The instruction module 240 identifies a particular user-specified action from among the multiple user-specified actions according to the user preference. Subsequently, the instruction module 240 generates the user interface to include an option to perform the particular user-specified action. As a concrete example, if the user data indicates that the second user frequently uses a particular app, the instruction module 240 identifies a particular user-specified action associated with the particular app and an option to perform the particular user-specified action is included in the user interface. As such, the instruction module 240 augments the user interface according to inferred preferences of the second user.

Figure 6:
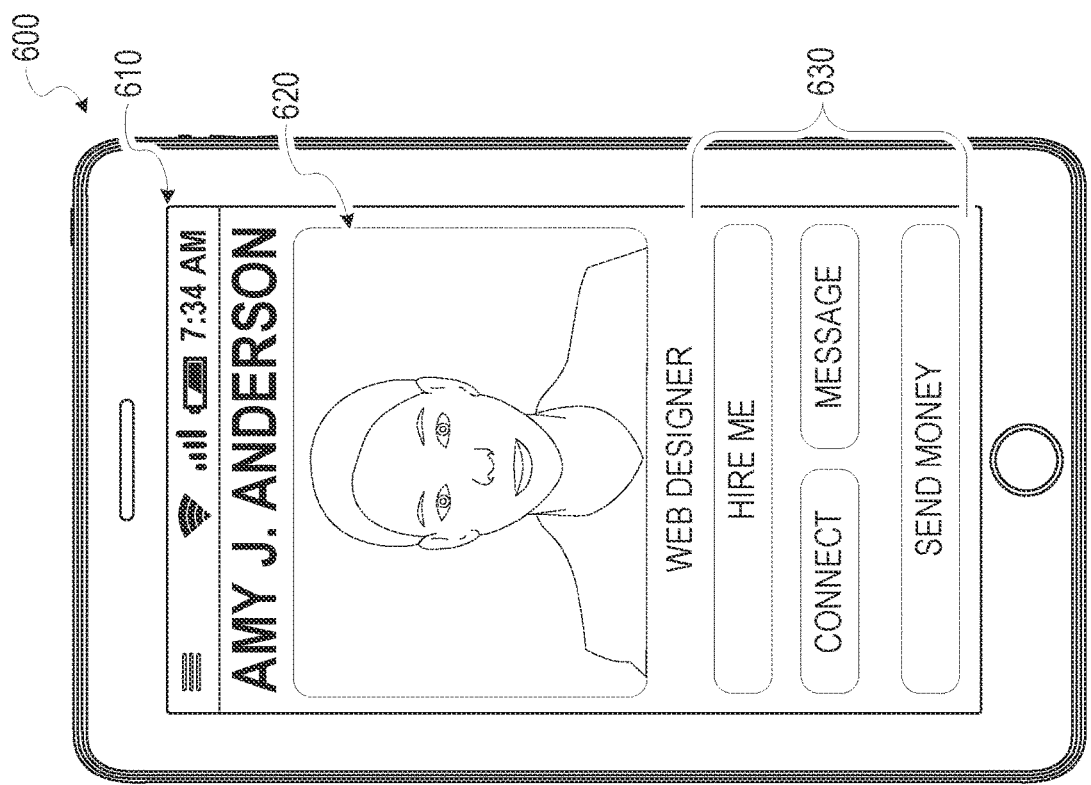
FIGS. 5 and 6 are example user interface diagrams depicting example user interfaces for providing an option to perform guided personal identity based actions, according to some example embodiments.
Figure 5:
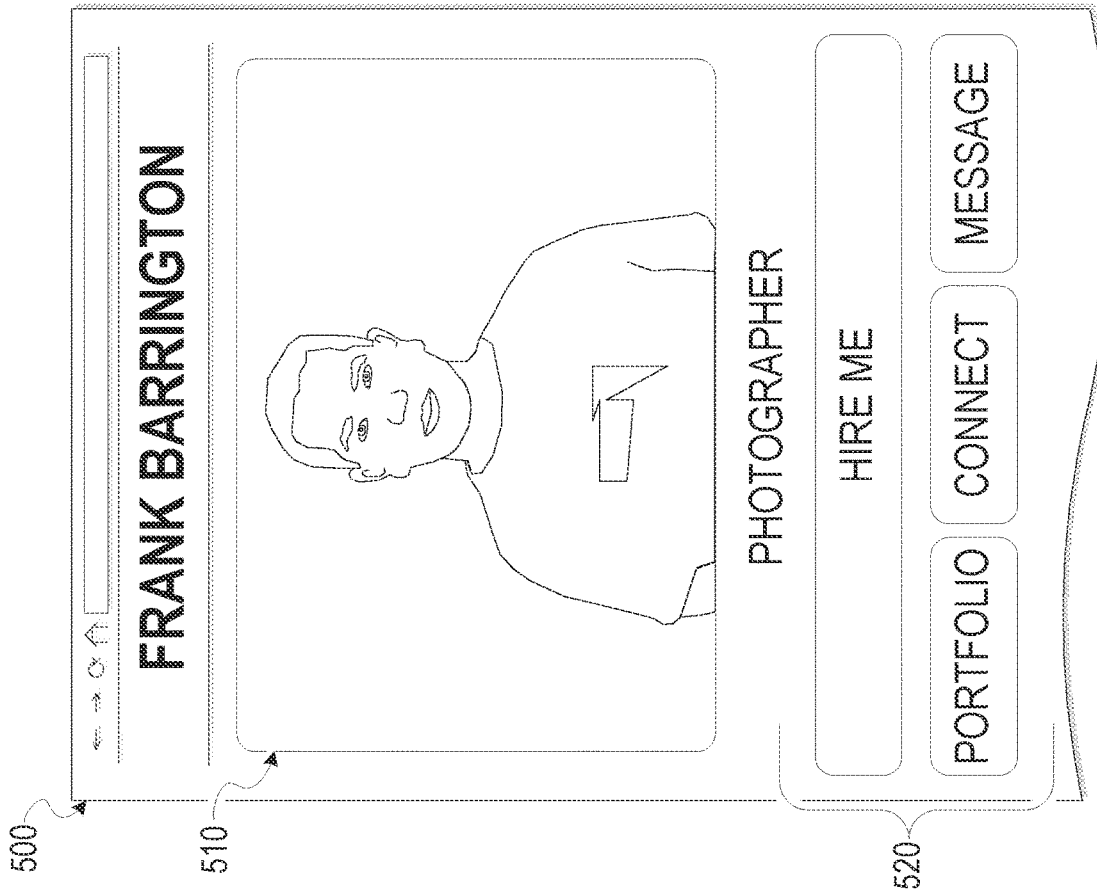

Turning now to FIGS. 5 and 6, example user interface diagrams depicting example user interfaces for providing an option to perform guided personal identity based actions are shown. Although user interfaces described herein (e.g., FIGS. 5, 6, 9, 11, 14, and 15) depict specific example user interfaces and user interface elements, these are merely non-limiting examples, and many other alternate user interfaces and user interface elements can be generated by the presentation module 220 and presented to the user. It will be noted that alternate presentations of the displays described herein include additional information, graphics, options, and so forth; other presentations include less information, or provide abridged information for easy use by the user.

FIG. 5 depicts an example user interface 500 that includes user interface elements 510 and 520 that cause a particular user-specified action to be performed when activated (e.g., clicked or tapped on a touch screen display). In some embodiments, the user interface 500 is a browser user interface operating on a computer or mobile device. Similarly, FIG. 6 depicts an example user device 600 (e.g., smart phone) displaying an example user interface 610 that includes user interface elements 620 and 630 that cause a particular user-specified action to be performed when activated (e.g., clicked or tapped on a touch screen display).

Referring back to FIG. 4, at operation 470, the presentation module 220 causes presentation of the generated user interface on the second user device. For instance, the presentation module 220 can transmit the user interface and an instruction to present the user interface to the second user device.

In further embodiments, the communication module 210 receives a selection of the option to perform the user-specified action from the second user device. The instruction module 240 performs (or causes performance of) the user-specified action in response to receiving the selection of the option from the second user device. The data module 250 stores an indication of the selection of the option in association with the second user device and the identifier (e.g., stored in the database(s) 134). At a later time, the communication module 210 receives a subsequent indication of the identifier from the second user device. The presentation module 220 generates the user interface, in part, according to the stored indication of the selection. For instance, if a particular user-specified action has previously been performed, the instruction module 240 can omit an option to perform the user-specified action from subsequent user interface presentations.

In still further embodiments, the data module 250 stores a history of identifiers for a particular user. For example, for each indication of an identifier the communication module 210 receives, the data module 250 stores the identifier in association with an identification of the second user. The data module 250 accesses a history of identifiers for a particular user and the presentation module 220 can generate a user interface including the history of identifiers for the particular user. In these embodiments, the user interface is operable to perform the user-specified action corresponding to respective identifiers included in the history of identifiers. In this way, a particular user can revisit particular user-specified actions previously performed or stored.

In yet further embodiments, the instruction module 240 determines that the second user device is detecting the identifier from a machine-readable visual representation of the identifier being displayed on the first user device in real time. For instance, the first user device can communicate an indication, to the communication module 210, indicating that the first user device is currently displaying a particular machine-readable visual representation.

In some embodiments, the first user device and the second user device are geo-enabled devices operable to communicate a geolocation to the communication module 210. In other embodiments, the instruction module 240 derives an approximate location using an Internet Protocol (IP) location service or another similar service. The instruction module 240 can then infer that the second user device is detecting the machine-readable visual representation from the first user device by comparing the geolocations of the first user device and the second user device to determine that the devices are within a distance of each other (e.g., a distance short enough for the second user device to detect the machine-readable visual representation being displayed on the first user device).

Based on the determination that the second user device is detecting the identifier from a machine-readable visual representation of the identifier being displayed on the first user device in real time, the instruction module 240 causes an interaction between the second user device and the first user device in real time. In an example, the interaction comprises automatically establishing a peer-to-peer communication session between the first user device and the second user device (e.g., a WI-FI® peer-to-peer session or a BLUETOOTH® pairing).

Figure 7A:
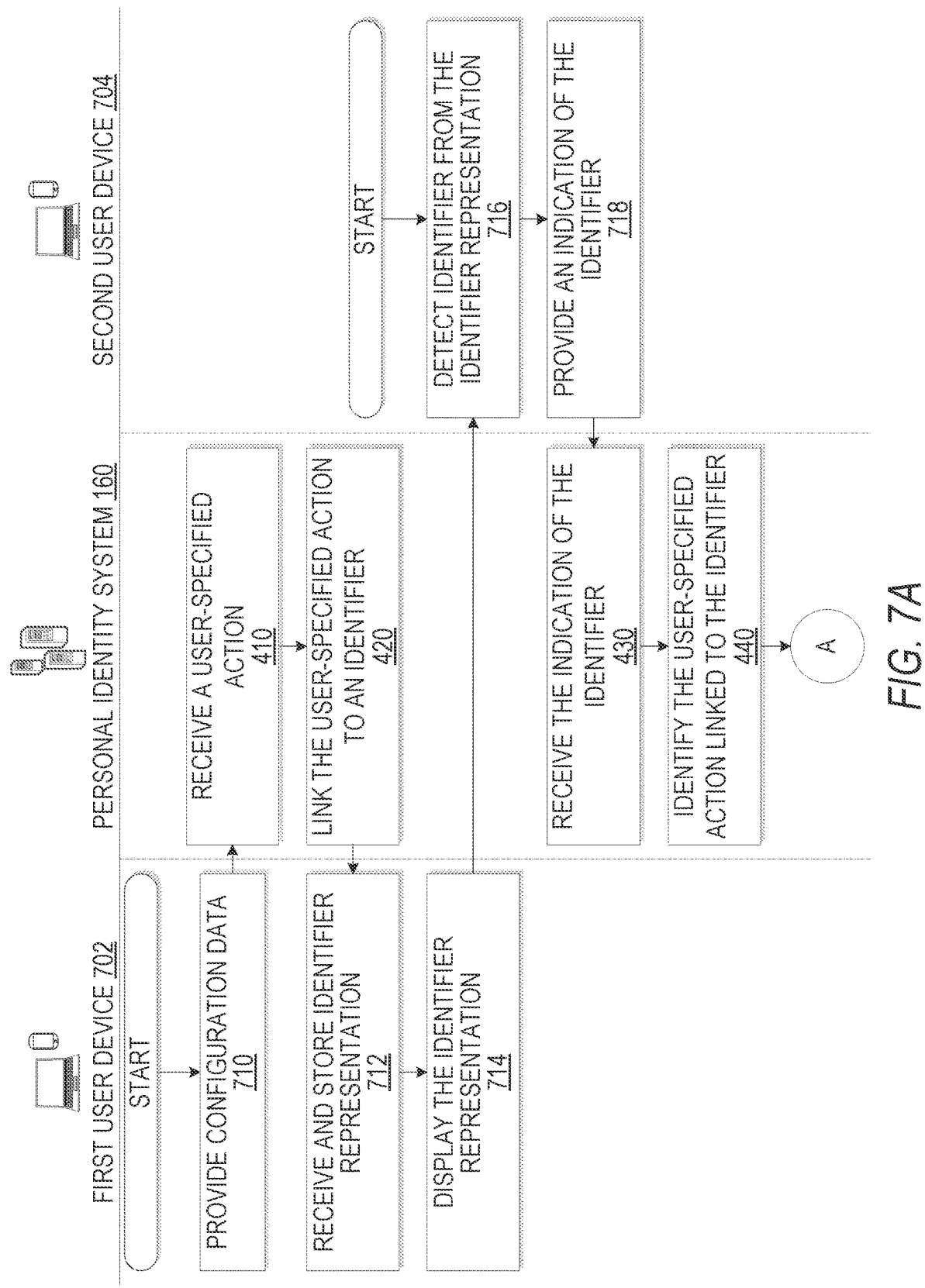
FIGS. 7A and 7B are swim-lane diagrams illustrating various communications between devices performing a method for guided personal identity based actions, according to some example embodiments.
Figure 7B:
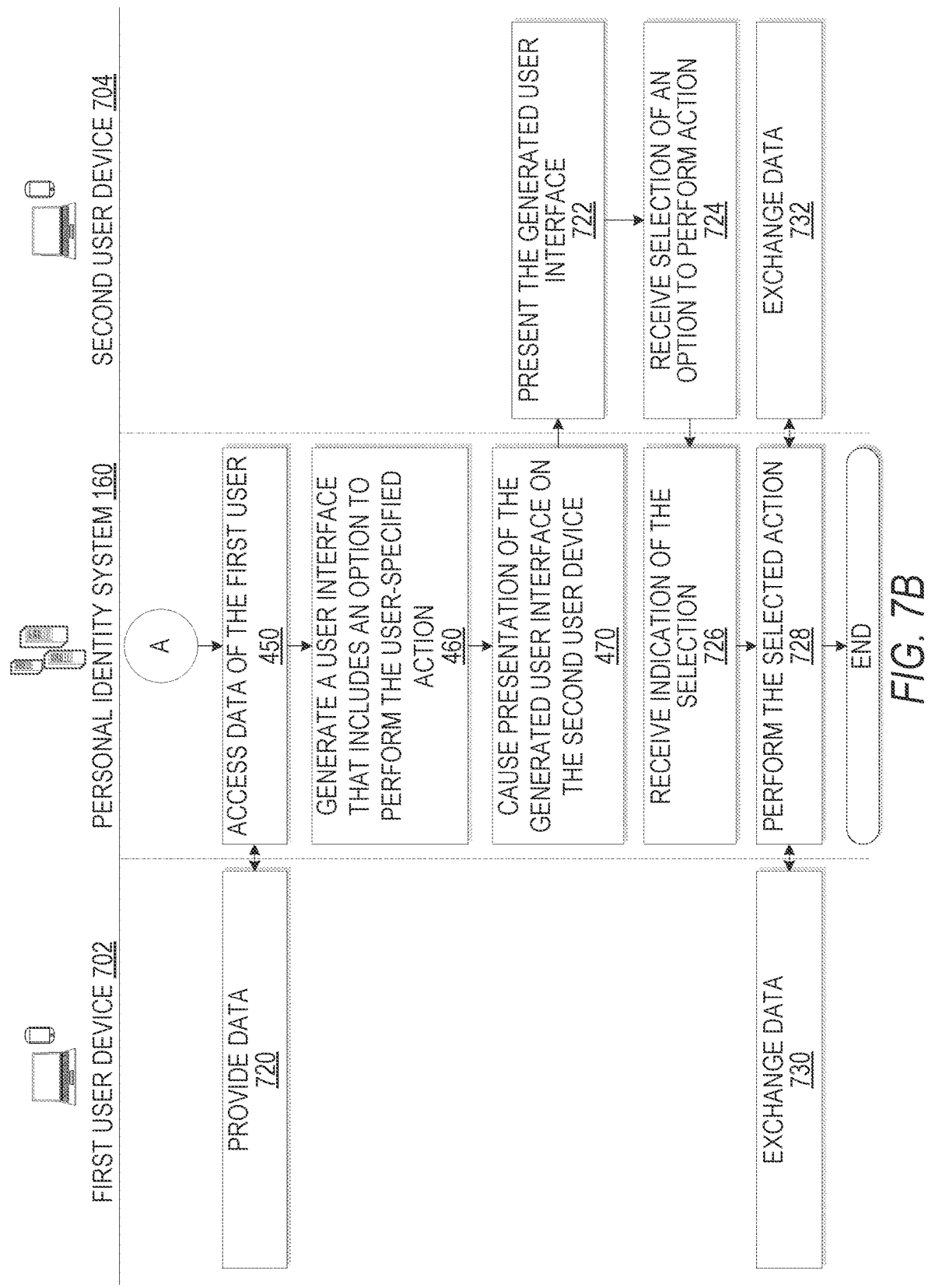

FIGS. 7A and 7B are swim-lane diagrams illustrating various communications between devices performing a method for guided personal identity based actions. At operation 710, a first user device 702 provides configuration data for a guided personal identity based action to the personal identity system 160. The configuration data can comprise a user specification of an action and data to be used when the action is performed.

As described above, at the operation 410, the configuration module 230 receives a user-specified action from the first user device 702. For instance, the configuration data includes the user-specified action. In various embodiments, the personal identity system 160 provides user interfaces configured to receive the configuration data to the first user device 702.

At the operation 420, the configuration module 230 links the user-specified action to an identifier. As further described in connection with FIGS. 8 and 9, the personal identity system 160 can generate a machine-readable visual representation that encodes the identifier. In some embodiments, the machine-readable visual representation is generated at the first user device 702.

Subsequently, at operation 712, the first user device 702 receives and stores the identifier representation. Although FIG. 7A shows the first user device 702 providing the configuration data, another device of the first user can provide the configuration data to the personal identity system 160 and a different device of the first user can store the identifier representation. That is to say, in some embodiments, the device that provides the configuration data can be different from the device that stores the identifier representation.

In various embodiments, the above operations of FIG. 7A are performed at a first time and subsequent operations of FIGS. 7A and 7B are performed at a second time after the first time (e.g., the identifier representation is configured during a first session and subsequently displayed during a later session). At operation 714, the first user device 702 displays the identifier representation. For instance, the identifier representation is displayed on a display screen of the first user device 702 such that another device can detect the identifier representation.

At operation 716, a second user device 704 detects the identifier from the identifier representation. For instance, the identifier representation comprises a QR code and a camera sensor of the second user device 704 detects and decodes the signal corresponding to the identifier representation being displayed on the first user device 702.

At operation 718, the second user device 704 provides an indication of the identifier to the personal identity system 160. For instance, once the second user device 704 decodes the identifier representation to extract the identifier, the second user device 704 sends a request for the user-specified action corresponding with the identifier to the personal identity system 160.

As described above in connection with FIG. 4, at the operation 430, the communication module 210 receives an indication of the identifier from the second user device 704.

At the operation 440, the instruction module 240 identifies the user-specified action linked to the identifier (e.g., via a lookup).

In continuing with the discussion in connection with FIG. 7A, FIG. 7B shows additional operations. At operation 450, the data module 250 accesses the data of the first user to be used when the user-specified action is performed.

At operation 720, the first user device 702 provides data to the personal identity system 160. In other embodiments, the data for the user-specified action is stored by the personal identity system 160 (e.g., stored in the database(s) 134).

As described above in connection with FIG. 4, at the operation 460, the presentation module 220 or the instruction module 240 generates a user interface that includes an option to perform the user-specified action using the data of the first user. At the operation 470, the presentation module 220 causes presentation of the generated user interface on the second user device 704.

At operation 722, the second user device 704 presents the generated user interface. The presentation of the generated user interface on the second user device 704 is an interactive presentation allowing the user of the second user device 704 to provide input, such as by selecting an option to perform the user-specified action.

At operation 724, the second user device 704 receives a selection of an option to perform the user-specified action. In some instances, the second user device 704 receives multiple selections of options to perform multiple user-specified actions.

At operation 726, the communication module 210 or the instruction module 240 receives an indication of the selection to perform the user-specified action. For instance, the second user device 704 sends a request to the personal identity system 160 to perform a particular user-specified action. In other embodiments, the user-specified action is performed locally on the second user device 704 without further communication with the personal identity system 160.

At operation 728, the instruction module 240 performs the selected action. In performing the selected action the instruction module 240 can cause the exchange of data between any of the first user device 702 at operation 730, the second user device 704 at operation 732, the personal identity system 160, or a third party server (not shown).

Figure 8:
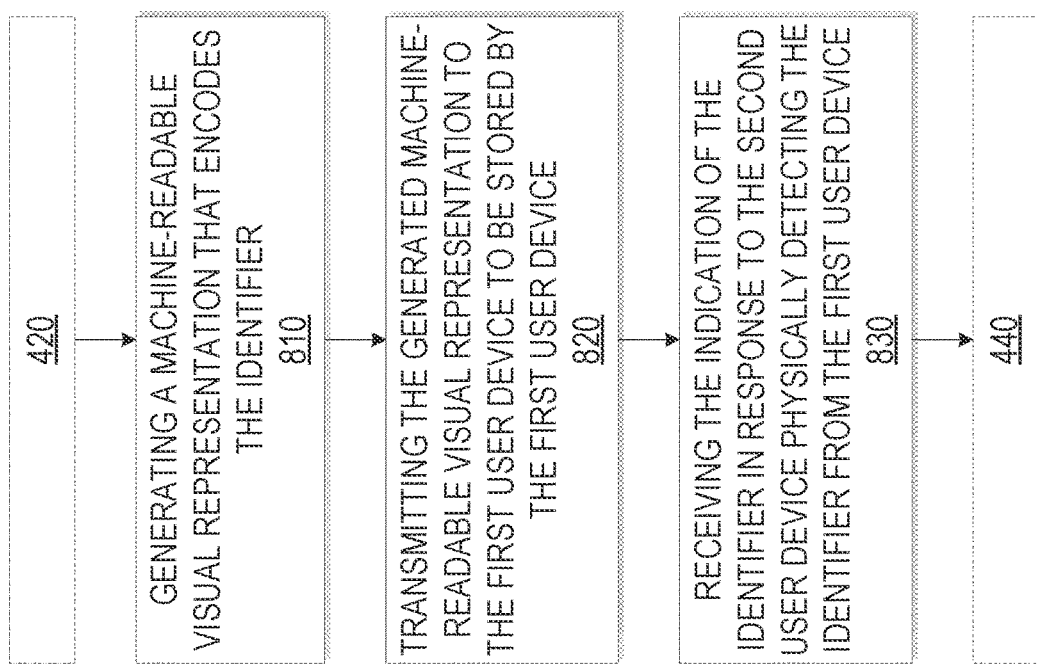
FIG. 8 is a flow diagram illustrating further example operations for guided personal identity based actions, according to some example embodiments.

FIG. 8 is a flow diagram illustrating further example operations for guided personal identity based actions. After the communication module 210 receives the user-specified action at the operation 410 and the configuration module 230 links the user-specified action to the identifier at the operation 420, the additional example operations of FIG. 8 are performed in some example embodiments.

At operation 810, the configuration module 230 generates a machine-readable visual representation (e.g., a QR code) that encodes the identifier. For instance, the configuration module 230 generates an image file that includes the machine-readable visual representation.

At operation 820, the configuration module 230 transmits the generated machine-readable visual representation (e.g., an image file) to the first user device to be stored by the first user device and subsequently displayed on a user interface of the first user device. For example, the first user device stores multiple machine-readable visual representations corresponding to different user-specified actions or sets of user-specified actions. The first user of the first user device can display a particular machine-readable visual representation when the first user desires another user to perform the user-specified actions corresponding to the particular machine-readable visual representation.

Similar to the operation 430 discusses above, at operation 830, the communication module 210 receives the indication of the identifier in response to the second user device physically detecting in real time the identifier from the machine-readable visual representation being displayed on the first user device. For instance, the second user device scans a QR code being displayed by the first user device. Subsequently, the personal identity system 160 performs the operation 440 and subsequent operations of the example method 400 as discussed in connection with FIG. 4 above.

Figure 9:
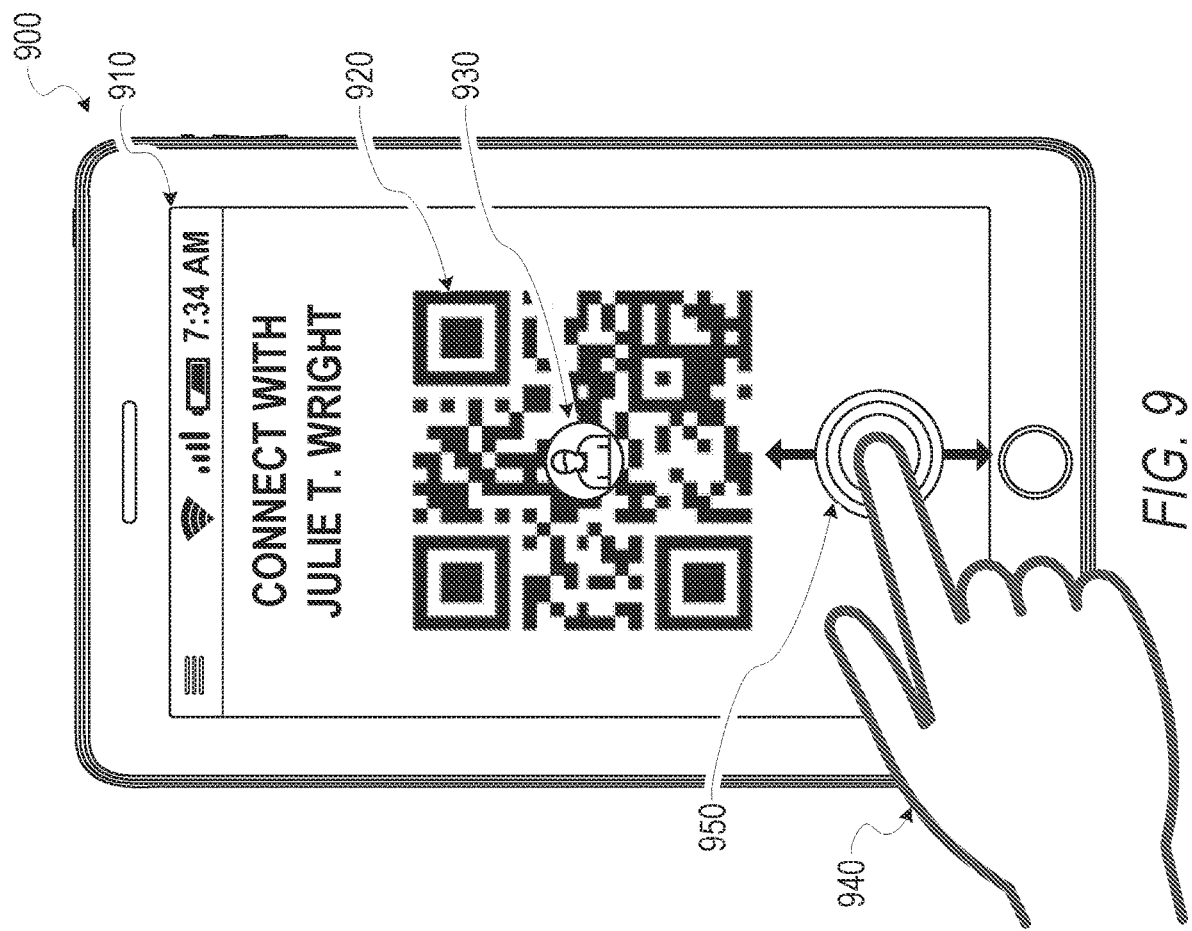
FIG. 9 is a user interface diagram depicting an example user interface for displaying a machine-readable visual representation that encodes an identifier, according to some example embodiments.

FIG. 9 is a user interface diagram 900 depicting an example user interface 910 for displaying a machine-readable visual representation 920 (e.g., a QR code) that encodes an identifier. In some embodiments, the machine-readable visual representation 920 includes text, an image, or an animation, such as element 930, representative of the user-specified action associated with the machine-readable visual representation 920. In an embodiment, multiple machine-readable visual representations are stored on a particular user device. In this embodiment, a user 940 can scroll through or otherwise navigate the multiple machine-readable visual representations via a touch-based gesture 950 (e.g., a swipe performed by sliding a finger or pointing instrument in a particular direction across a display).

Figure 10:
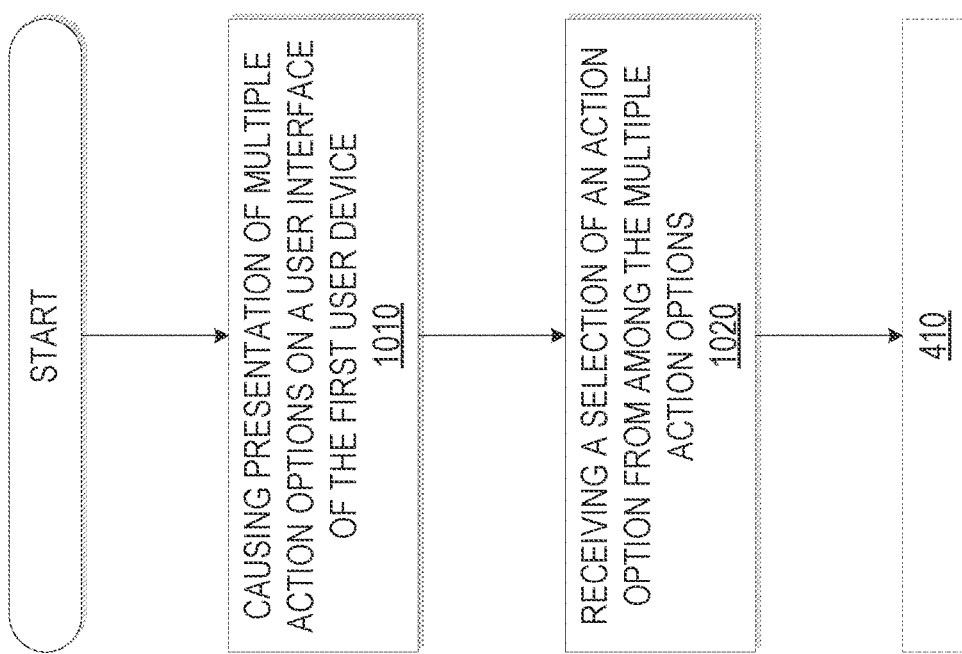
FIG. 10 is a flow diagram illustrating further example operations for configuring guided personal identity based actions, according to some example embodiments.

The following discussion in connection with FIGS. 10 and 11 is again directed to configuration of a particular guided personal identity based action. FIG. 10 is a flow diagram illustrating further example operations for configuring guided personal identity based actions. Prior to the operations of the method 400 discussed above, the personal identity system 160 performs the operations of FIG. 10 in some example embodiments. At operation 1010, the configuration module 230 or the presentation module 220 causes presentation of multiple action options on a user interface of the first user device. For instance, the personal identity system 160 can provide a user interface that includes predefined actions and includes fields for inputting data associated with the predefined actions.

In further embodiments, the configuration module 230 determines the action options to include in the user interface based on user data of the first user. For instance, the configuration module 230 can retrieve data indicating a particular social network service the first user is a member of from the user device, a third party server, or another source. Based on the data of the first user indicating the first user is a member of the particular social network service, the configuration module 230 determines a particular action option associated with the particular social network service and includes the particular action option in the user interface to be presented on the first user device.

At operation 1020, the communication module 210 receives a selection of an action option from among the multiple action options. The first user, or another operator configuring a particular guided personal identity based action, can provide selections of action options along with data associated with the action option to configure the particular guided personal identity based action. Subsequently, at the operation 410, the communication module 210 receives the user-specified action (e.g., the user-specified action indicated by the selection of the action option receive at the operation 1020).

Figure 11:
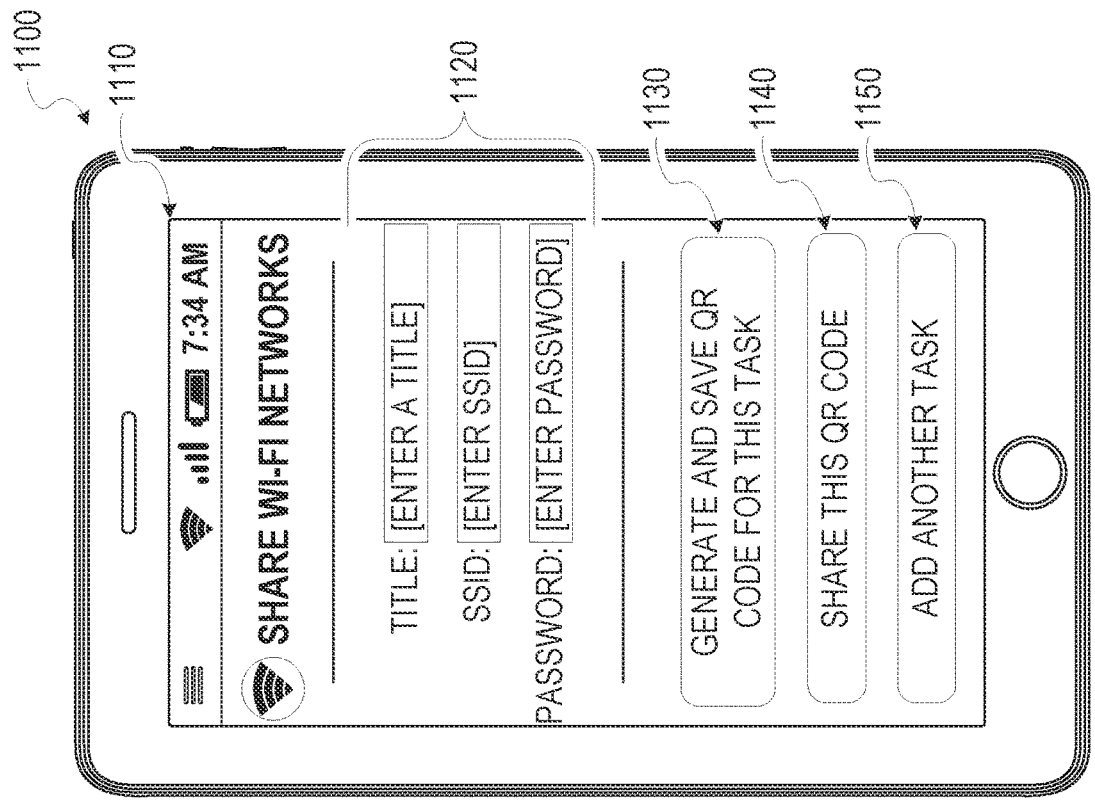
FIG. 11 is a user interface diagram depicting an example user interface for configuration of guided personal identity based actions, according to some example embodiments.

FIG. 11 is a user interface diagram 1100 depicting an example user interface 1110 for configuration of guided personal identity based actions. A user interface element 1120 allows the user to provide data associated with a particular action. In this example, the user can provide WI-FI® settings data for an action directed to establishing a WI-FI® connection (e.g., network login credentials). In further embodiments, the user can specify conditions or rules (discussed above in connection with FIG. 4) for the action (e.g., a condition of being a contact of the user on a social network server prior performing the action). A user interface element 1130 allows the user to generate and save a QR code for the user-specified action configured using the user interface 1110. A user interface element 1140 allows the user to share the QR code with other users (e.g., via a social messaging service communication, an email, or an SMS message). A user interface element 1150 provides the user an option to generate additional QR codes for additional user-specified actions.

The following discussion in connection with FIGS. 12-15 is directed to analytics associated with guided personal identity based actions. At the operation 430, the communication module 210 receives the indication of the identifier from the second user device. Subsequently, the additional operations of FIGS. 12 and 13 are performed in some example embodiments as discussed below.

FIG. 12 is a flow diagram illustrating example operations for performing analytics in association with a particular identifier. At operation 1210, the analytics module 260 updates an identifier metric corresponding to the identifier. The identifier metric may include an access count incremented each time an indication of the identifier is received. For instance, each time a QR code is scanned, the access count is incremented. In some embodiments, as further discussed in connection with FIG. 13, contextual data associated with instances of a scan are stored and can be subsequently used for various analyses (e.g., scans from a particular country or region, scans during a particular time of day, scans from particular device types, or scans from users with particular demographics).

At operation 1220, the presentation module 220 causes presentation of the identifier metric on a user interface of the first user device. The identifier metric or other metrics calculated by the analytics module 260 can be presented using a variety of visual and textual formats.

FIG. 13 is a flow diagram illustrating example operations for performing analytics in association with a particular identifier. In response to receiving the indication of the identifier from the second user device, at operation 1310, the data module 250 retrieves context attributes from the second user device. For example, the context attributes comprise device type, device model, a time stamp, geolocation, or other sensor data of the second user device.

At operation 1320, the data module 250 stores the context attributes in association with the identifier. For instance, the data module 250 can store the context attributes in the database(s) 134.

At operation 1330, the analytics module 260 identifies a characteristic corresponding to the identifier by analyzing the context attributes stored in association with the identifier. For instance, the analytics module 260 can identify a particular characteristic comprising a high density clustering of scans with a certain geolocation (e.g., many scans in a particular geographic vicinity). Such a characteristic can be of interest to the user who configured the scan. In some embodiments, the first user can specify rules or conditions based on the characteristics associated with analytics generated by the analytics module 260. For example, once a particular number of scans within a certain geographic boundary is exceeded, the user-specified action is no longer available to users within the geographic boundary.

At operation 1340, the presentation module 220 causes presentation of the characteristic on a user interface of the first user device. The presentation module 220 can generate a variety of text, graphics, images, and animations for presentation of the characteristic.

Figure 14:
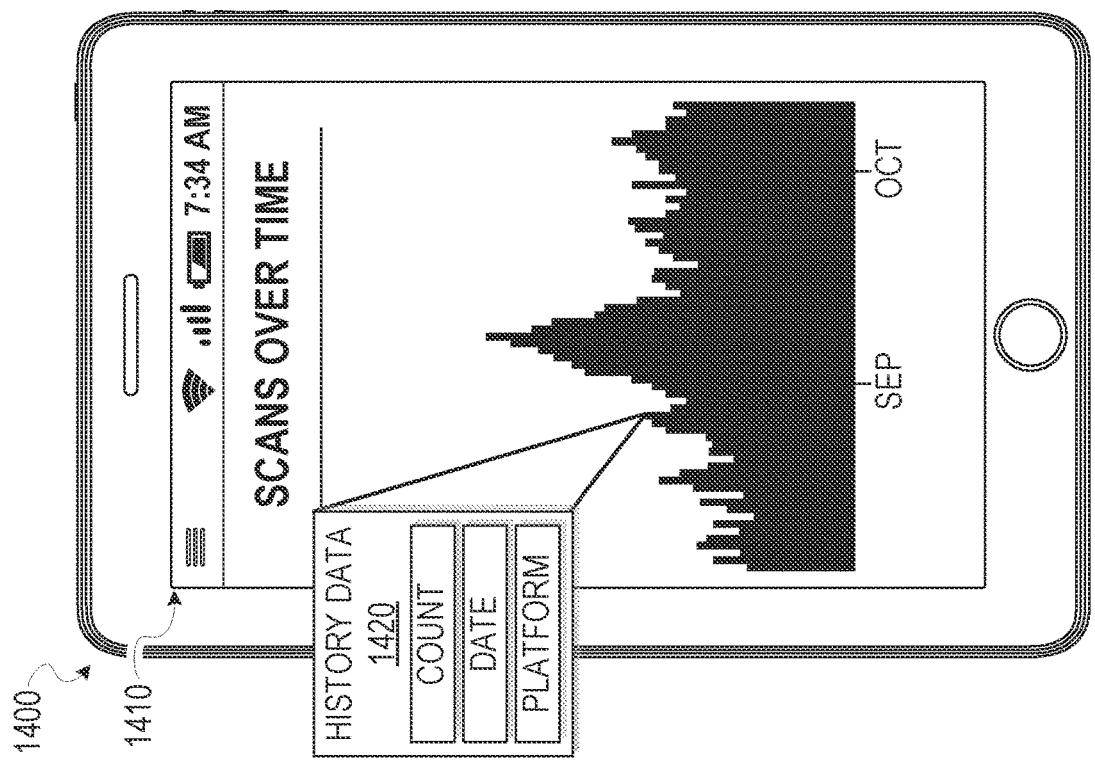

FIG. 14 is a user interface diagram 1400 depicting an example user interface 1410 for displaying a various analytics generated by the analytics module 260. In this example, the user interface 1410 is displaying scan history data, such as history data 1420, over time. The scan history data can include a variety of information such as a count of scans for a particular identifier for a particular date and platform.

Figure 15:
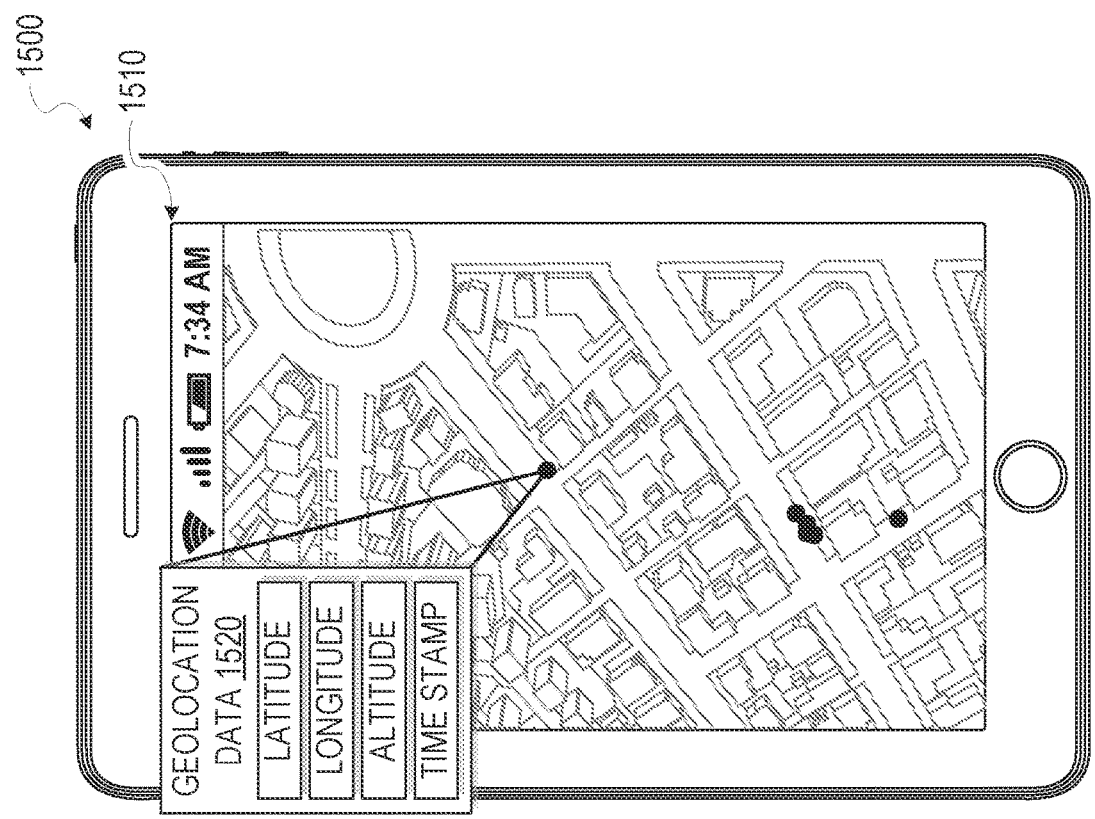
FIGS. 14 and 15 are user interface diagrams depicting an example user interface for presenting analytics associated with guided personal identity based actions, according to some example embodiments.

FIG. 15 is a user interface diagram 1500 depicting an example user interface 1510 for displaying various analytics generated by the analytics module 260. In this example, the user interface 1510 is displaying geolocation data associated with scans, such as geolocation data 1520 (e.g., latitude, longitude, altitude, and time stamp), for a particular time period.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 16:
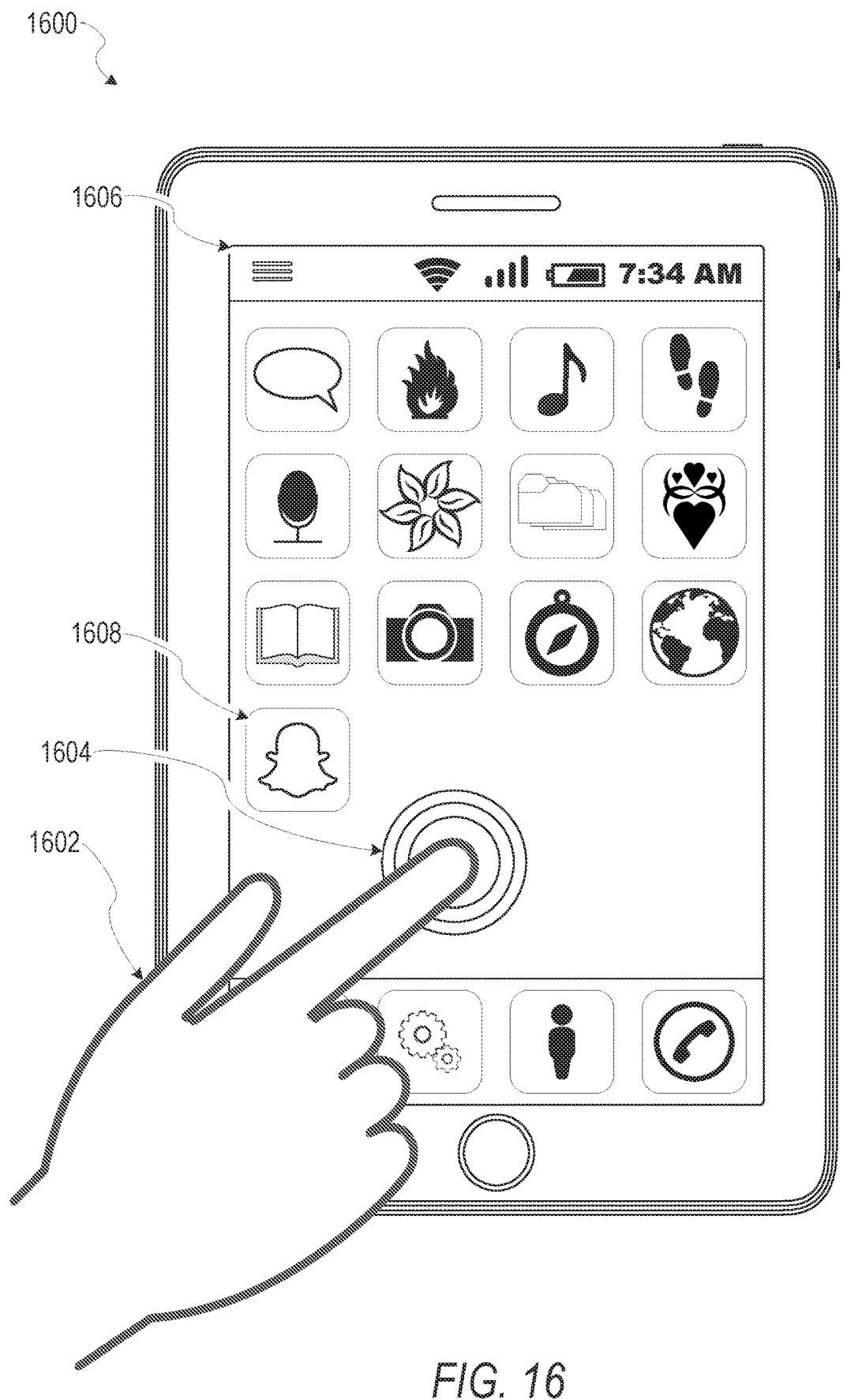
FIG. 16 is a user interface diagram depicting an example mobile device and mobile operating system interface, according to some example embodiments.

FIG. 16 illustrates an example mobile device 1600 executing a mobile operating system (e.g., IOS™, ANDROID™, WINDOWS® Phone, or other mobile operating systems), consistent with some embodiments. In one embodiment, the mobile device 1600 includes a touch screen operable to receive tactile data from a user 1602. For instance, the user 1602 may physically touch 1604 the mobile device 1600, and in response to the touch 1604, the mobile device 1600 may determine tactile data such as touch location, touch force, or gesture motion. In various example embodiments, the mobile device 1600 displays a home screen 1606 (e.g., Springboard on IOS™) operable to launch applications or otherwise manage various aspects of the mobile device 1600. In some example embodiments, the home screen 1606 provides status information such as battery life, connectivity, or other hardware statuses. The user 1602 can activate user interface elements by touching an area occupied by a respective user interface element. In this manner, the user 1602 interacts with the applications of the mobile device 1600. For example, touching the area occupied by a particular icon included in the home screen 1606 causes launching of an application corresponding to the particular icon.

Many varieties of applications (also referred to as "apps") can be executed on the mobile device 1600, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1600 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1600 includes a social messaging app 1608 such as SNAPCHAT® that, consistent with some embodiments, allows users to exchange ephemeral messages that include media content. In this example, the social messaging app 1608 can incorporate aspects of embodiments described herein.

Software Architecture

Figure 17:
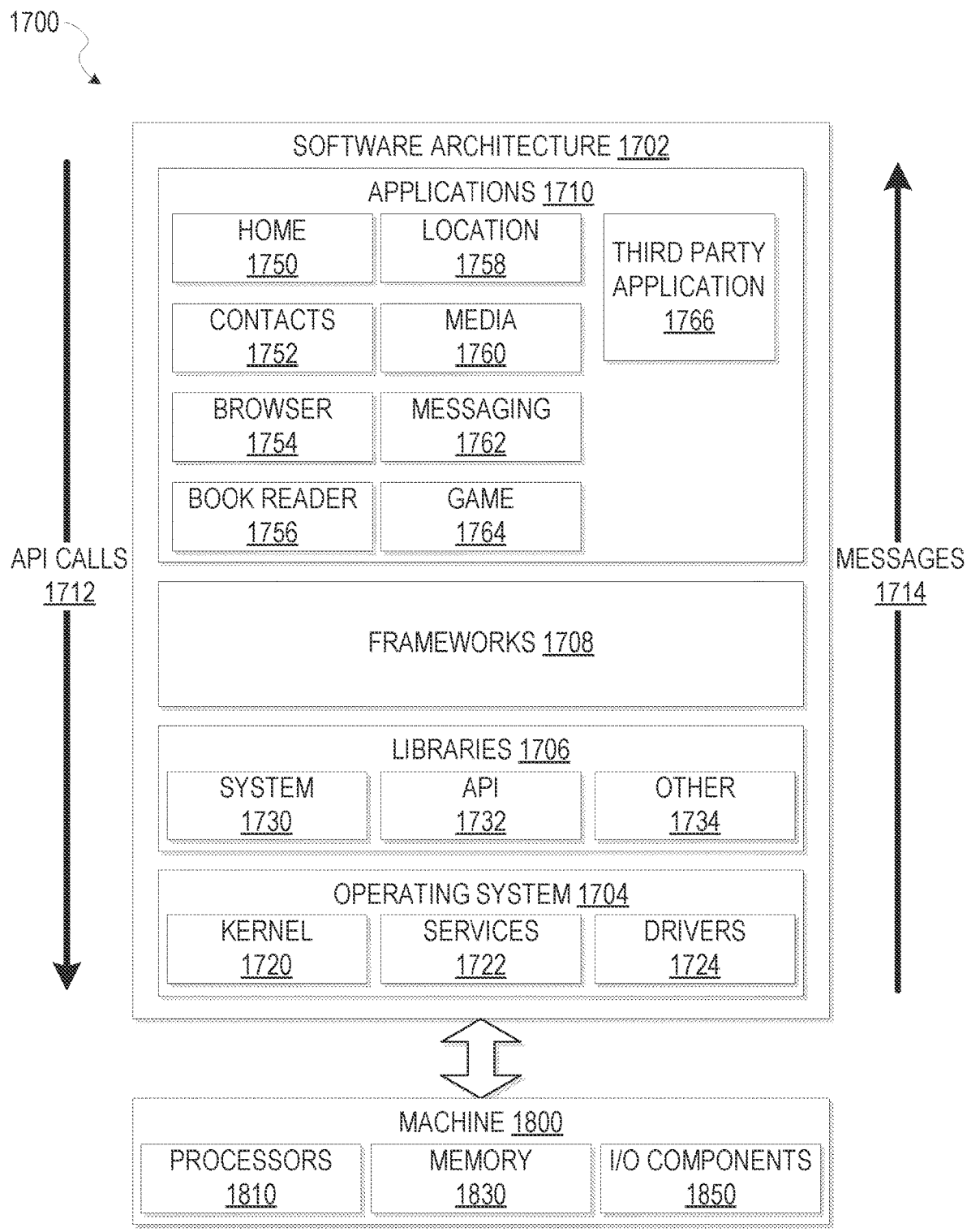
FIG. 17 is a block diagram illustrating an example of a software architecture that may be installed on a machine, according to some example embodiments.

FIG. 17 is a block diagram 1700 illustrating an architecture of software 1702, which can be installed on any one or more of the devices described above. FIG. 17 is merely a non-limiting example of a software architecture, and it will be appreciated that many other architectures can be implemented to facilitate the functionality described herein. In various embodiments, the software 1702 is implemented by hardware such as a machine 1800 of FIG. 18 that includes processors 1810, memory 1830, and I/O components 1850. In this example architecture, the software 1702 can be conceptualized as a stack of layers where each layer may provide a particular functionality. For example, the software 1702 includes layers such as an operating system 1704, libraries 1706, frameworks 1708, and applications 1710. Operationally, the applications 1710 invoke application programming interface (API) calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 1766 can invoke the API calls 1712 provided by the operating system 1704 to facilitate functionality described herein.

Example Machine Architecture and Machine-Readable Medium

Figure 18:
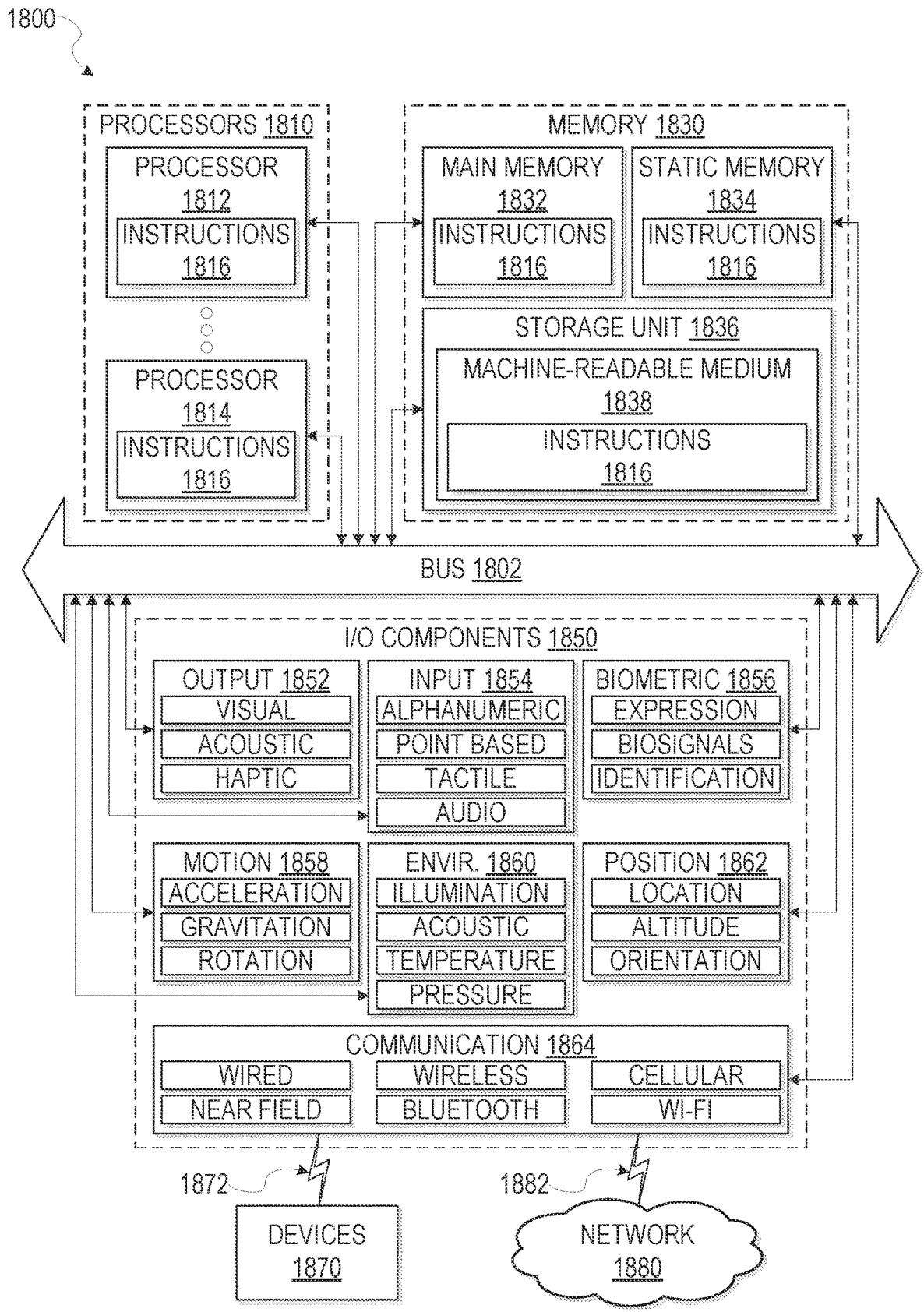
FIG. 18 is a block diagram presenting a diagrammatic representation of a machine in the form of a computer system within which a set of instructions may be executed for causing the machine to perform any of the methodologies discussed herein, according to an example embodiment.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

In various embodiments, the machine 1800 comprises processors 1810, memory 1830, and I/O components 1850, which can be configured to communicate with each other via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1812 and a processor 1814 that may execute the instructions 1816. The term "processor" is intended to include multi-core processors that may comprise two or more independent processors (also referred to as "cores") that can execute instructions contemporaneously. Although FIG. 18 shows multiple processors, the machine 1800 may include a single processor with a single core, a single processor with multiple cores (e.g., a multi-core processor), multiple processors with a single core, multiple processors with multiples cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1838 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1838.

As used herein, the term "memory" refers to a machine-readable medium 1838 able to store data temporarily or permanently and may be taken to include, but not be limited to, random-access memory (RAM), read-only memory (ROM), buffer memory, flash memory, and cache memory. While the machine-readable medium 1838 is shown in an example embodiment to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., an accelerometer), gravitation sensor components, rotation sensor components (e.g., a gyroscope), and so forth. The environmental components 1860 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1870 may be another machine or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1838 is non-transitory (in other words, not having any transitory signals) in that it does not embody a propagating signal. However, labeling the machine-readable medium 1838 "non-transitory" should not be construed to mean that the medium is incapable of movement; the medium should be considered as being transportable from one physical location to another. Additionally, since the machine-readable medium 1838 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   hardware processing circuitry configured to perform operations comprising:
   receiving an action from a first device of a first user;
   generating a QR code that visually represents an identifier of the action and includes a graphical element representing the action, the graphical element comprising an animation embedded within at least a portion of a machine readable code of the QR code;
   causing presentation of the QR code on the first device;
   determining that a second device of a second user has interacted with the QR code presented on the first device; and
   in response to determining that the second device has interacted with the QR code presented on the first device:
   generating a user interface that includes an option to automatically include a current location of the second device in a message transmitted to the first device;
   causing presentation of the generated user interface on the second device; and
   disabling one or more options presented in the user interface to make one or more options unavailable to the second user based on a device type or device model of the second device.

2. The system of claim 1, wherein the operations further comprise:
   causing the QR code to be presented on the first device in response to detecting a swipe gesture along a particular direction across a display of the first device that navigates through multiple QR codes.

3. The system of claim 1, wherein the operations further comprise:
   obtaining a condition associated with the action linked to the QR code;
   accessing data associated with the second user; and
   determining that the data associated with the second user satisfies the condition associated with the action linked to the QR code.

4. The system of claim 1, wherein the operations further comprise:
   determining the device type or the device model of the second device;
   emphasizing a first of the one or more options presented in the user interface over a second option of the one or more options based on the device type or device model of the second device.

5. The system of claim 1, wherein the operations further comprise:
   updating a metric corresponding to the QR code in response to determining that the second device of the second user has interacted with the QR code presented on the first device; and
   causing the metric to be presented on the first device of the first user.

6. The system of claim 1, wherein the operations further comprise:
   emphasizing a first of the one or more options presented in the user interface over a second option of the one or more options based on the device type or device model of the second device.

7. The system of claim 1, wherein the action comprises multiple user-specified actions received from the first device, each of the multiple user-specified actions pertains to the first user and uses data of the first user when performed, the operations further comprising identifying the first user and the second user on a social network and forming a relationship between the first user and the second user on the social network in response to determining based on the data that the first user and the second user are not connected on the social network.

8. The system of claim 1, wherein the operations further comprise:
   accessing user data of the second user stored on the second device;
   determining a preference of the second user based on an analysis of the user data of the second user, the preference being indicative of a preference to perform certain actions;
   identifying a particular user-specified action from among multiple user-specified actions according to the preference of the second user; and
   generating the user interface to include an additional option to perform the particular user-specified action.

9. The system of claim 1, wherein the operations further comprise:
   identifying a particular user-specified action from among multiple user-specified actions according to a preference of the second user; and
   generating the user interface to include an additional option to perform the particular user-specified action.

10. A method comprising:
    receiving an action from a first device of a first user;
    generating a QR code that visually represents an identifier of the action and includes a graphical element representing the action, the graphical element comprising an animation embedded within at least a portion of a machine readable code of the QR code;

causing presentation of the QR code on the first device;

determining that a second device of a second user has interacted with the QR code presented on the first device; and in response to determining that the second device has interacted with the QR code presented on the first device:

generating a user interface that includes an option to automatically include a current location of the second device in a message transmitted to the first device;

causing presentation of the generated user interface on the second device; and disabling one or more options presented in the user interface to make one or more options unavailable to the second user based on a device type or device model of the second device.

11. The system of claim 1, wherein the operations further comprise:

generating a metric that includes an access count incremented each time an interaction with the QR code is detected.

12. The system of claim 1, wherein the operations further comprise associating contextual data with each instance of an interaction with the QR code, the contextual data comprising a representation of a geographical location from which the interaction is detected, a time of day during which the interaction is detected, or a device type used to interact with the QR code.

13. The system of claim 1, wherein the operations further comprise:

identifying a characteristic corresponding to the identifier by analyzing contextual data associated with each instance of an interaction with the QR code; and causing presentation of the identified characteristic on the first device of the first user.

14. The system of claim 1, wherein the operations further comprise:

identifying a density of clusterings of scans within a certain geolocation based on contextual data comprising a representation of a geographical location from which an interaction with the QR code is detected;

based on the density, determining that a number of scans within the certain geolocation has reached a threshold; and in response to determining that the number of scans within the certain geolocation has reached a threshold, disabling performance of the action in the certain geolocation.

15. The system of claim 1, wherein the operations further comprise displaying a geographical location from which an interaction with the QR code is detected including a latitude, longitude, altitude and time stamp for a particular time period on the first device of the first user.

16. The method of claim 10, comprising:

emphasizing a first of one or more options presented in the user interface over a second option of the one or more options based on a device type or device model of the second device.

17. A non-transitory computer readable storage medium comprising instructions that when executed by hardware processing circuitry cause the hardware processing circuitry to perform operations, the operations comprising:

receiving an action from a first device of a first user;

generating a QR code that visually represents an identifier of the action and includes a graphical element representing the action, the graphical element comprising an animation embedded within at least a portion of a machine readable code of the QR code;

causing presentation of the QR code on the first device;

determining that a second client device of a second user has interacted with the QR code presented on the first device; and in response to determining that the second device has interacted with the QR code presented on the first device:

generating a user interface that includes an option to automatically include a current location of the second device in a message transmitted to the first device;

causing presentation of the generated user interface on the second device; and disabling one or more options presented in the user interface to make one or more options unavailable to the second user based on a device type or device model of the second device.

18. The non-transitory computer readable storage medium of claim 17, wherein the operations further comprise:

causing the QR code to be presented on the first device in response to detecting a swipe gesture along a particular direction across a display of the first device that navigates through multiple QR codes.

19. The non-transitory computer readable storage medium of claim 17, wherein the operations further comprise:

obtaining a condition associated with the action linked to the QR code;

accessing data associated with the second user; and determining that the data associated with the second user satisfies the condition associated with the action linked to the QR code.

20. The non-transitory computer readable storage medium of claim 17, wherein the operations further comprise:

emphasizing a first of the one or more options presented in the user interface over a second option of the one or more options based on the device type or device model of the second device.

* * * * *